US012661838B2

(12) United States Patent
Atsuta et al.

(10) Patent No.: US 12,661,838 B2
(45) Date of Patent: Jun. 23, 2026

(54) MOLDING MANAGEMENT DEVICE, PRODUCTION PLAN GENERATION DEVICE, AND MOLDING MACHINE CONTROL DEVICE

(71) Applicant: SEIKO EPSON CORPORATION, Tokyo (JP)

(72) Inventors: Kosuke Atsuta, Shiojiri (JP); Yusuke Mitsuma, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 111 days.

(21) Appl. No.: 18/535,138

(22) Filed: Dec. 11, 2023

(65) Prior Publication Data

US 2024/0190057 A1 Jun. 13, 2024

(30) Foreign Application Priority Data

Dec. 12, 2022 (JP) ................................. 2022-197653

(51) Int. Cl.
*B29C 45/76* (2006.01)

(52) U.S. Cl.
CPC .... *B29C 45/76* (2013.01); *B29C 2945/76658* (2013.01); *B29C 2945/76732* (2013.01)

(58) Field of Classification Search
CPC .......... B29C 45/76; B29C 2945/76658; B29C 2945/76732; B29C 45/766; B29C 45/768;
(Continued)

(56) References Cited

U.S. PATENT DOCUMENTS 5,039,463 A * 8/1991 Loren ................. B29C 45/1732
264/572
9,205,587 B2 * 12/2015 de Oliveira Antunes ..................
B29C 45/2703
(Continued)

FOREIGN PATENT DOCUMENTS

CA 2752669 A1 * 6/2011 ......... B29C 45/2618
DE 102020111942 A1 * 11/2020 ............. B29C 45/84
(Continued)

OTHER PUBLICATIONS

Kazmer et al., "The Process Capability of Multi-Cavity Pressure Control for the Injection Molding Process", Nov. 1997, Polymer Engineering and Science, vol. 37, No. 11. (Year: 1997).*
(Continued)

*Primary Examiner* — Mohammad Ali
*Assistant Examiner* — Kelvin Booker
(74) *Attorney, Agent, or Firm* — Harness, Dickey & Pierce, P.L.C.

(57) ABSTRACT

A molding management device for managing an injection molding machine includes: a first production unit information generation unit configured to generate first production unit information which is information on a molding job for molding the molded article; a second production unit information generation unit configured to generate second production unit information which is information on a lot of the molded article and is associated with a specific cavity; a first acquisition unit configured to acquire shot identification information which is information on a shot for injecting the molding material into the cavity; a second acquisition unit configured to acquire molded article information which is information on the molded article; and a storage unit. The storage unit stores the first production unit information, the second production unit information, the shot identification information, and the molded article information in associa-
(Continued)

tion with one another, stores the second production unit information as information on a lower data hierarchy than the first production unit information, and stores the shot identification information as information on a lower data hierarchy than the second production unit information.

1 Claim, 25 Drawing Sheets

(58) Field of Classification Search
CPC .. B29C 2945/6163; B29C 2945/76257; B29C 2945/76648
See application file for complete search history.

(56) References Cited

U.S. PATENT DOCUMENTS

| | | | | |
|---|---|---|---|---|
| 9,908,273 | B2 * | 3/2018 | de Oliveira Antunes | .......... B29C 45/7613 |
| 10,307,951 | B2 * | 6/2019 | de Oliveira Antunes | .......... B29C 45/80 |
| 10,518,453 | B2 * | 12/2019 | de Oliveira Antunes | .......... B29C 45/2806 |
| 10,625,456 | B2 * | 4/2020 | de Oliveira Antunes | .......... G05D 7/0635 |
| 11,065,793 | B2 * | 7/2021 | de Oliveira Antunes | .......... B29C 45/7613 |
| 11,065,794 | B2 * | 7/2021 | de Oliveira Antunes | .......... B29C 45/76 |
| 2014/0046465 | A1 * | 2/2014 | de Oliveira Antunes | .......... B29C 45/77 700/97 |
| 2016/0052186 | A1 * | 2/2016 | de Oliveira Antunes | .......... B29C 45/2703 700/220 |
| 2016/0114513 | A1 | 4/2016 | Tsuchiya | |
| 2017/0151703 | A1 * | 6/2017 | de Oliveira Antunes | .......... B29C 45/7613 |
| 2017/0291343 | A1 | 10/2017 | Uchiyama | |
| 2018/0264701 | A1 * | 9/2018 | Galati | .......... B29C 45/7613 |
| 2018/0339443 | A1 * | 11/2018 | de Oliveira Antunes | .......... B29C 45/2708 |
| 2019/0184616 | A1 * | 6/2019 | de Oliveira Antunes | .......... B29C 45/2806 |
| 2019/0184617 | A1 * | 6/2019 | de Oliveira Antunes | .......... B29C 45/7613 |
| 2019/0275719 | A1 * | 9/2019 | de Oliveira Antunes | .......... B29C 45/7613 |
| 2021/0387393 | A1 * | 12/2021 | Collins | .......... B29C 45/77 |
| 2022/0152901 | A1 * | 5/2022 | Minowa | .......... B29C 45/7686 |
| 2022/0324149 | A1 * | 10/2022 | Otsuki | .......... B29C 45/76 |

FOREIGN PATENT DOCUMENTS

| | | | | | |
|---|---|---|---|---|---|
| EP | 0461626 | A2 | * | 12/1991 | .......... B29C 45/76 |
| EP | 0461627 | A1 | * | 12/1991 | .......... G05B 19/39 |
| JP | S59150734 | A | * | 8/1984 | |
| JP | H0594447 | A | * | 4/1993 | .......... G05B 19/39 |
| JP | H08241347 | A | * | 9/1996 | .......... Y02P 90/30 |
| JP | 2000-025079 | A | | 1/2000 | |
| JP | 2016-083790 | A | | 5/2016 | |
| JP | 2017-185711 | A | | 10/2017 | |

OTHER PUBLICATIONS

Kazmer, D., "Precision Process Control of Injection Molding", 2006, Precision Injection Molding. (Year: 2006).*

Chen et al., "A Review of Current Developments in Process and Quality Control for Injection Molding", May 2004, Advances in Polymer Technology, vol. 24, No. 3, 165-182 (2005). (Year: 2004).*

Obielodan et al., "Fabrication of Multi-Material Structures Using Ultrasonic Consolidation and Laser-Engineered Net Shaping", 2010, Dissertation—Doctor OF Philosophy in Mechanical Engineering, Utah State University. (Year: 2010).*

Agrawal et al., "Injection-Molding Process Control—A Review", 1997, Polymer Engineering and Science, Mid-Oct. 1987, Yo/. 27, No. 18. (Year: 1997).*

Yeung et al., "Injection Moulding, 'C-Mold' Cae package, Process Parameter Design and Quality Function Deployment: A case study of intelligent materials processing", 1997, Journal of Materials Processing Technology 63, 481-487. (Year: 1997).*

Murthy et al., "Mass Production Tools and Process Readiness for Uniform Parts-Injection Molding Application", 2017, Mass Production Tools and Process Readiness for Uniform Parts-Injection Molding Application. Journal of Polymer & Composites, 5(3), 30-40. (Year: 2017).*

Moayyedian et al., "Gate design and filling process analysis of the cavity in injection molding process", 2015, Adv. Manuf. (2016) 4:123-133. (Year: 2015).*

Huzaim et al., "Potential of Rapid Tooling in Rapid Heat Cycle Molding: A Review", Apr. 2022, Materials, 15, 3725. (Year: 2022).*

Parizs et al., "Multiple In-Mold Sensors for Quality and Process Control in Injection Molding", Jan. 2023, Sensors 23, 1735 (Year: 2023).*

Whlean et al., "Using Additive Manufacturing to Produce Injection Moulds Suitable for Short Series Production", 29th International Conference on Flexible Automation and Intelligent Manufacturing (FAIM2019), Jun. 24-28, 2019, Limerick, Ireland. (Year: 2019).*

Smud et al., "Advanced Process Control for Injection Molding", Polymer Engineering and Science, Mid-Aug. 1991, vol. 31, No. 75. (Year: 1991).*

Kazmer, D., "Multi-Cavity Pressure Control in the Filling and Packing Stages of the injection Molding Process", Polymer Engineering and Science, Nov. 1997, vol. 37, No. 11. (Year: 1997).*

Chen et al., "A Review of Current Developments in Process and Quality Control for Injection Molding", May 2004, Advances in Polymer Technology, vol. 24, No. 3, 165-182. (Year: 2004).*

Moayyedian et al., "The analysis of short shot possibility in injection molding process", May 2016, Int J Adv Manuf Technology 91:3977-3989. (Year: 2016).*

Agrawal et al., "Injection-Molding Process Control—A Review", Polymer Engineering and Science, Mid-Oct. 1987, Yo/. 27, No. 18. (Year: 1997).*

* cited by examiner

FIRST PRODUCTION PLAN GENERATION PROCESSING

GENERATE FIRST PRODUCTION UNIT INFORMATION ~S210

ACQUIRE PLANNED PRODUCTION QUANTITY INFORMATION ~S220

ACQUIRE CAVITY QUANTITY INFORMATION ~S230

GENERATE SECOND PRODUCTION UNIT INFORMATION ~S240

SET DATA HIERARCHY ~S250

GENERATE PRODUCTION PLAN ~S260

STORE IN STORAGE UNIT ~S270

END

JOB ID: Job1 —┬— LOT ID: Lot1

├— LOT ID: Lot2

└— LOT ID: Lot3

PRODUCTION PROGRESS SCREEN 2022-06-08

| INJECTION MOLDING MACHINE | MOLDING ITEM | METAL MOLD | QUANTITY OF PRODUCED MOLDED ARTICLES | PLANNED PRODUCTION COMPLETION TIME | DEFECT RATE (ppm) | CYCLE TIME (sec) |
|---|---|---|---|---|---|---|
| MOLDING MACHINE A | COMPONENT A | METAL MOLD A | PLAN: 400 ACTUAL: 391 | 12:00 (DELAY 0:00) | 22500 | 141.2 |
| MOLDING MACHINE B | COMPONENT B | METAL MOLD B | PLAN: 400 ACTUAL: 378 | 17:00 (DELAY 0:00) | 55000 | 133.3 |
| MOLDING MACHINE C | COMPONENT C | METAL MOLD C | PLAN: 400 ACTUAL: 385 | 22:00 (DELAY 0:00) | 37500 | 140.3 |
| MOLDING MACHINE D | COMPONENT D | METAL MOLD D | PLAN: 400 ACTUAL: 387 | 03:00 (DELAY 0:00) | 32500 | 148.8 |

MOLDING MANAGEMENT DEVICE, PRODUCTION PLAN GENERATION DEVICE, AND MOLDING MACHINE CONTROL DEVICE

The present application is based on, and claims priority from JP Application Serial Number 2022-197653, filed Dec. 12, 2022, the disclosure of which is hereby incorporated by reference herein in its entirety.

BACKGROUND

1. Technical Field

The present disclosure relates to a molding management device, a production plan generation device, and a molding machine control device.

2. Related Art

JP-A-2017-185711 discloses a molding system that detects an abnormality in a cavity of a metal mold mounted on an injection molding machine.

When an abnormality is detected in one of a plurality of cavities formed in a metal mold, for example, processing of suspending shipping of all molded articles molded in the cavity in which the abnormality is detected or processing of discarding the molded articles may be executed on a system of a management system that manages molded articles. In other words, the molded articles molded in the cavity in which the abnormality is detected may be collectively processed on the system of the management system.

In a general management system, one manufacturing lot includes molded articles molded in a plurality of cavities. In the general management system, molded articles molded in a specific cavity are provided in a plurality of manufacturing lots. In such a case, when collectively processing the molded articles molded in the cavity in which the abnormality is detected on the system, the management system may generate a data set including only the molded articles molded in the cavity in which the abnormality is detected. The above-described data set is generated by the management system acquiring information identifying a molded article molded in a cavity in which an abnormality is detected among information identifying molded articles and stored in the management system in association with information on each manufacturing lot. When the management system generates a new data set, a processing load on the management system is greater than when no new data set is generated.

As described above, in the general management system, the processing load on the system may increase when collectively processing the molded articles molded in the cavity in which the abnormality is detected on the system. Therefore, there is a demand for a technique capable of reducing a processing load on a system when collectively processing molded articles molded in a specific cavity on the system of a management system.

SUMMARY

According to a first aspect of the present disclosure, a molding management device is provided. The molding management device is a molding management device for managing an injection molding machine that molds a molded article by injecting a molding material into a cavity of a mold. The molding management device includes: a first production unit information generation unit configured to generate first production unit information which is information on a molding job for molding the molded article; a second production unit information generation unit configured to generate second production unit information which is information on a lot of the molded article and is associated with a specific cavity; a first acquisition unit configured to acquire shot identification information which is information on a shot for injecting the molding material into the cavity; a second acquisition unit configured to acquire molded article information which is information on the molded article; and a storage unit. The storage unit stores the first production unit information, the second production unit information, the shot identification information, and the molded article information in association with one another, stores the second production unit information as information on a lower data hierarchy than the first production unit information, and stores the shot identification information as information on a lower data hierarchy than the second production unit information.

According to a second aspect of the present disclosure, a production plan generation device is provided. The production plan generation device is a production plan generation device for generating a production plan of a molded article molded by an injection molding machine injecting a molding material into a cavity of a mold. The production plan generation device includes: a first production unit information generation unit configured to generate first production unit information which is information on a molding job for molding the molded article; a second production unit information generation unit configured to generate second production unit information which is information on a lot of the molded article and is associated with a specific cavity; a third acquisition unit configured to acquire planned production quantity information which is information on a planned production quantity of the molded article; a fourth acquisition unit configured to acquire cavity quantity information which is information on a quantity of the cavity; a data hierarchy setting unit configured to set the second production unit information as information on a lower data hierarchy than the first production unit information; and a plan generation unit configured to generate the production plan based on the first production unit information, the second production unit information, the planned production quantity information, and the cavity quantity information.

According to a third aspect of the present disclosure, a molding machine control device is provided. The molding machine control device is a molding machine control device for controlling an injection molding machine that molds a molded article by injecting a molding material into a cavity of a mold. The molding machine control device includes: a first production unit information acquisition unit configured to acquire first production unit information which is information on a molding job for molding the molded article; a second production unit information acquisition unit configured to acquire second production unit information which is information on a lot of the molded article and is associated with a specific cavity; an operation identification information storage unit configured to store operation identification information which is the first production unit information assigned with the second production unit information as information on a lower data hierarchy; an operation data acquisition unit configured to acquire molding machine operation data which is information on operation data of the injection molding machine; an operation data storage unit; and an operation data storage control unit configured to cause the operation data storage unit to store the molding machine operation data and the operation identification information in association with each other.

BRIEF DESCRIPTION OF THE DRAWINGS

FIG. 22 is a diagram showing a production progress screen.

DESCRIPTION OF EMBODIMENTS

A. First Embodiment

Figure 1:
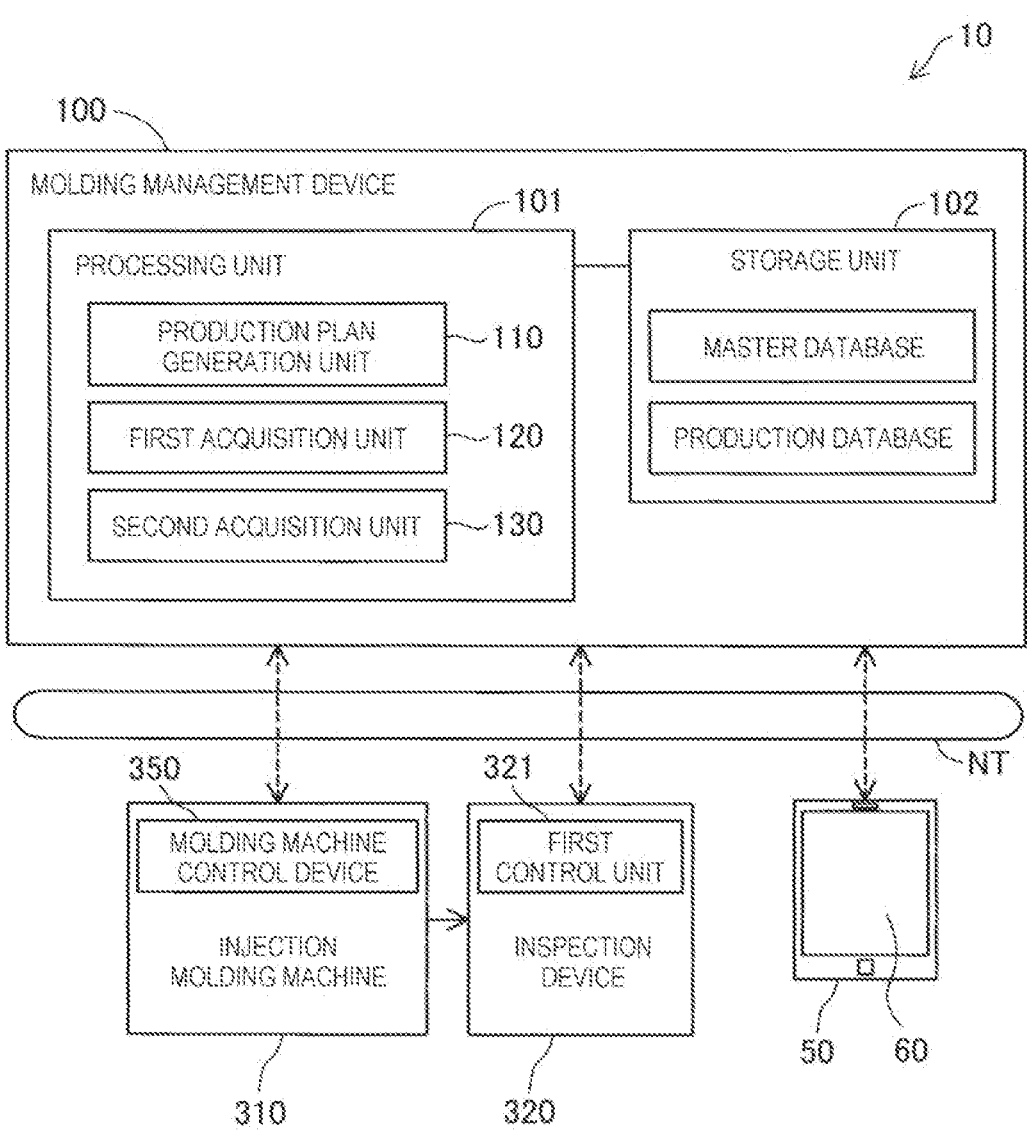
FIG. 1 is a diagram showing a schematic configuration of an injection molding machine management system.

FIG. 1 is a diagram showing a schematic configuration of an injection molding machine management system 10. The injection molding machine management system 10 includes a molding management device 100, an injection molding machine 310, an inspection device 320, and a terminal device 50. The molding management device 100 is communicably connected to the injection molding machine 310, the inspection device 320, and the terminal device 50. In the embodiment, the molding management device 100 is able to communicate with these devices via a network NT. The network NT may be, for example, a LAN, a WAN, or the Internet. Although FIG. 1 shows an example in which the injection molding machine management system 10 includes one injection molding machine 310 and one inspection device 320, the injection molding machine management system 10 may include a plurality of injection molding machines 310 and a plurality of inspection devices 320.

Figure 2:
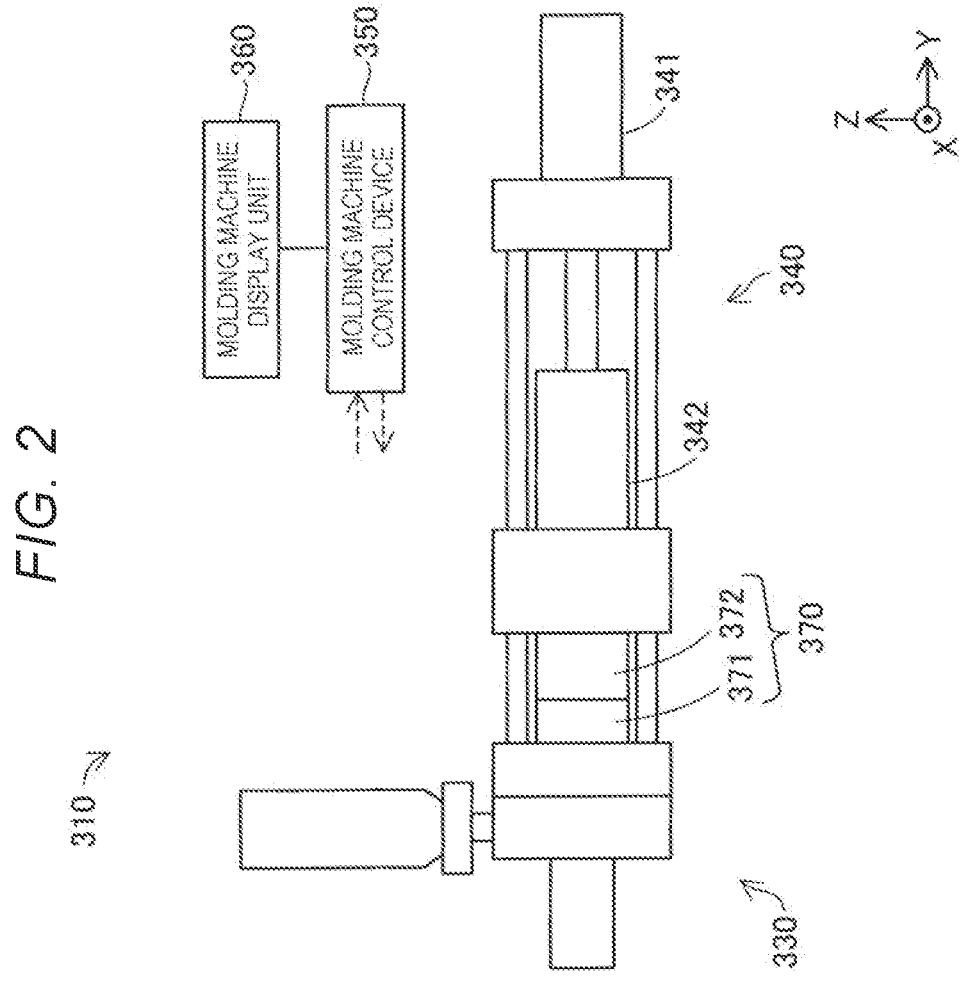
FIG. 2 is a diagram showing a schematic configuration of an injection molding machine.

FIG. 2 is a diagram showing a schematic configuration of the injection molding machine 310. In FIG. 2, arrows indicating X, Y, and Z directions orthogonal to one another are shown. The X direction and the Y direction are directions parallel to a horizontal plane. The Z direction is a direction parallel to a vertical direction. When an orientation is specified, a positive direction that is a direction indicated by an arrow is set as "+", a negative direction that is a direction opposite to the direction indicated by the arrow is set as "−", and the positive and negative signs are used in combination for direction notation.

The injection molding machine 310 includes a material dispensing unit 330, a mold clamping device 340, a molding machine control device 350, and a molding machine display unit 360. A mold 370 made of metal is mounted on the injection molding machine 310. The injection molding machine 310 injects a molding material generated by the material dispensing unit 330 into a cavity of the mold 370 to be described later to mold a molded article. The mold 370 may be made of resin or ceramic. The mold 370 made of metal is also referred to as a metal mold.

The molding machine control device 350 is implemented by a computer including one or a plurality of processors, a storage device, and an input and output interface that inputs and outputs signals to and from the outside. The molding machine control device 350 controls each unit of the injection molding machine 310 to perform injection molding. The detailed configuration of the molding machine control device 350 will be described later.

The mold 370 includes a fixed mold 371 and a movable mold 372. The fixed mold 371 is fixed to the material dispensing unit 330, and the movable mold 372 is provided to be movable forward and backward in a mold clamping direction with respect to the fixed mold 371 by the mold clamping device 340. In the embodiment, the mold clamping direction is a −Y direction.

The mold clamping device 340 has a function of opening and closing the fixed mold 371 and the movable mold 372. Under control of the molding machine control device 350, the mold clamping device 340 drives a mold driving unit 341 implemented by a motor to rotate a ball screw 342, and causes the movable mold 372 joined to the ball screw 342 to move with respect to the fixed mold 371, thereby opening and closing the mold 370. The cavity of the mold 370 is a space defined by the fixed mold 371 and the movable mold 372 in a state where the mold 370 is closed.

The molding machine display unit 360 is coupled to the molding machine control device 350. Various screens output from the molding machine control device 350 are displayed on the molding machine display unit 360. The molding machine display unit 360 has a function of receiving input from a user. The molding machine display unit 360 includes, for example, a touch panel type liquid crystal display.

The inspection device 320 shown in FIG. 1 is a device that inspects a molded article. The inspection device 320 includes a first control unit 321 and a camera (not shown). The first control unit 321 controls the camera to capture an image of the molded article, and analyzes the captured image of the molded article, thereby performing dimension measurement and appearance inspection of the molded article. The first control unit 321 measures, for example, a height, an entire length, and an entire width of the molded article as the dimension of the molded article. In the appearance inspection, the first control unit 321 inspects a defect of the molded article, for example, a scratch or warpage. The first control unit 321 determines whether the molded article is defective based on a dimension and appearance inspection result for each molded article, and transmits the inspection result as a determination result to the molding management device 100. The inspection device 320 may measure the dimension of the molded article using various displacement sensors or length measuring sensors instead of the camera.

The terminal device 50 is implemented by a computer including a CPU, a storage device, and a display unit 60. As the terminal device 50, for example, a tablet terminal, a notebook computer, a smartphone, or a handy terminal can be applied. Various screens output from the molding management device 100 are displayed on the display unit 60. The display unit 60 may have a touch panel function. The display unit 60 may be provided in the molding management device 100.

The molding management device 100 is implemented by a computer including a processing unit 101 and a storage unit 102. The processing unit 101 includes one or a plurality of processors and a main storage device. The storage unit 102 is implemented by an auxiliary storage device such as a hard disk drive.

The storage unit 102 stores a database. The databases stored in the storage unit 102 are a master database and a production database. The master database stores information predetermined before a production plan is generated by a production plan generation unit 110 to be described later, such as a quantity of cavities of a metal mold and a correspondence relationship between an ID number and a name of a molding item. The production database stores information generated or acquired by the injection molding machine management system 10 when a production plan is generated or when a molded article is produced. The master database and the production database may be integrated into one database. The storage unit 102 may store a database other than the master database and the production database. In the embodiment, the database includes a hierarchical database. The database may include a relational database or a network database.

The processing unit 101 includes the production plan generation unit 110, a first acquisition unit 120, and a second acquisition unit 130. The production plan generation unit 110, the first acquisition unit 120, and the second acquisition unit 130 are implemented by the processing unit 101 executing a program stored in the storage unit 102.

The production plan generation unit 110 generates a production plan of a molded article to be molded by the injection molding machine 310 injecting the molding material into the cavity of the mold 370. Details of the first acquisition unit 120 and the second acquisition unit 130 will be described later.

Figure 3:
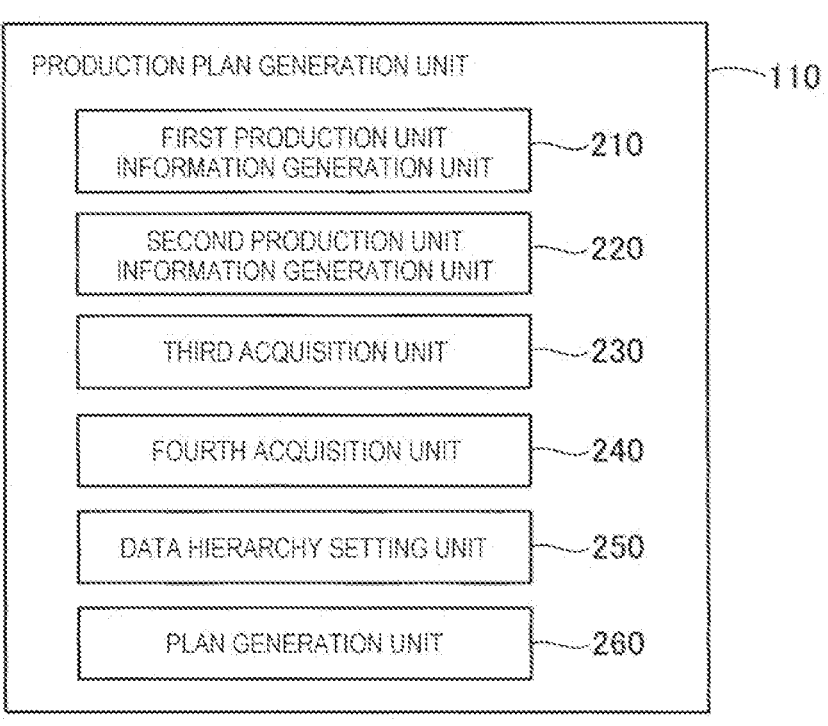
FIG. 3 is a diagram showing a schematic configuration of a production plan generation unit.

FIG. 3 is a diagram showing a schematic configuration of the production plan generation unit 110. The production plan generation unit 110 includes a first production unit information generation unit 210, a second production unit information generation unit 220, a third acquisition unit 230, a fourth acquisition unit 240, a data hierarchy setting unit 250, and a plan generation unit 260.

The first production unit information generation unit 210 generates first production unit information which is information on a molding job for molding the molded article. The first production unit information is identification information assigned to each molding job. The first production unit information is, for example, an ID number assigned to each molding job. The first production unit information is also referred to as a job ID.

The second production unit information generation unit 220 generates second production unit information that is information on a lot of the molded article and is associated with a specific cavity. Hereinafter, the lot of the molded article is also referred to as a manufacturing lot. The second production unit information is identification information assigned to each manufacturing lot. The second production unit information is, for example, an ID number assigned to each manufacturing lot. The second production unit information is also referred to as a lot ID.

The third acquisition unit 230 acquires, from the user, planned production quantity information which is information on a planned production quantity of the molded articles.

The fourth acquisition unit 240 acquires, from the master database, cavity quantity information which is information on a quantity of the cavities of the mold 370.

The data hierarchy setting unit 250 sets the second production unit information as information on a lower data hierarchy than the first production unit information. The data hierarchy is also referred to as a node.

The plan generation unit 260 generates a production plan based on the first production unit information, the second production unit information, the planned production quantity information, and the cavity quantity information.

Figure 4:
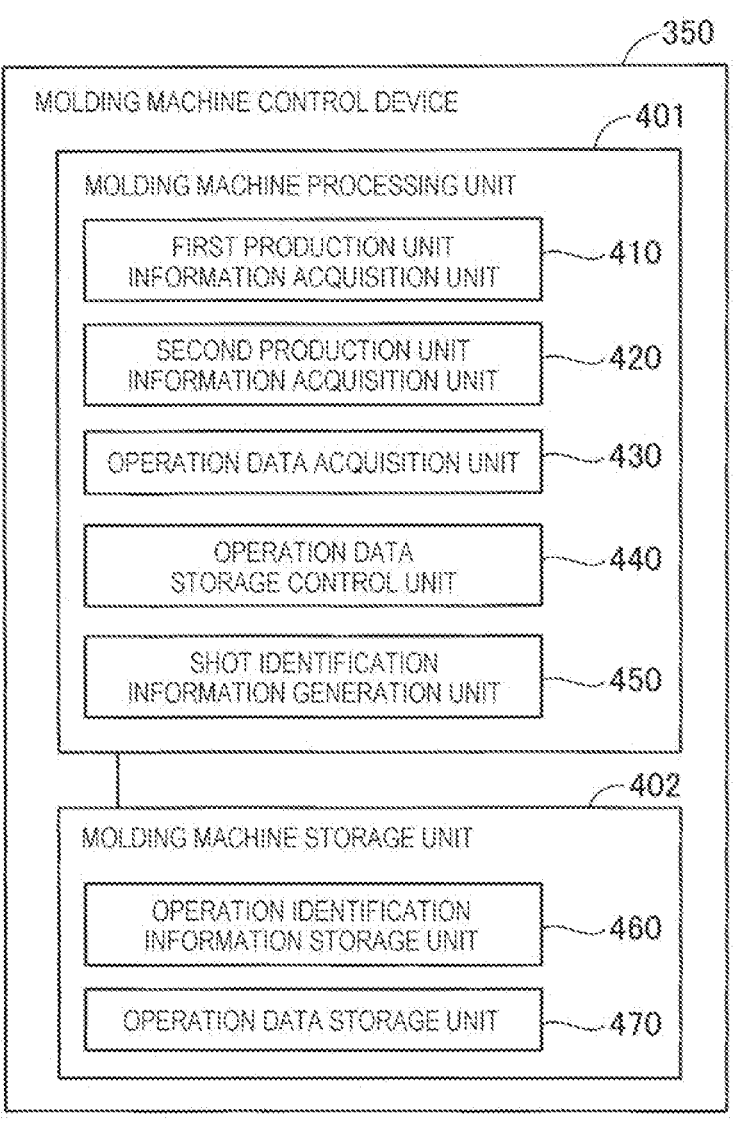
FIG. 4 is a diagram showing a schematic configuration of a molding machine control device provided in the injection molding machine.

FIG. 4 is a diagram showing a schematic configuration of the molding machine control device 350 provided in the injection molding machine 310. The molding machine control device 350 is implemented by a computer including a molding machine processing unit 401 and a molding machine storage unit 402. The molding machine processing unit 401 includes one or a plurality of processors and a main storage device. The molding machine storage unit 402 is implemented by an auxiliary storage device such as a hard disk drive.

The molding machine processing unit 401 includes a first production unit information acquisition unit 410, a second production unit information acquisition unit 420, an operation data acquisition unit 430, an operation data storage control unit 440, and a shot identification information generation unit 450. The first production unit information acquisition unit 410, the second production unit information acquisition unit 420, the operation data acquisition unit 430, the operation data storage control unit 440, and the shot identification information generation unit 450 are implemented by the molding machine processing unit 401 executing a program stored in the molding machine storage unit 402.

The molding machine storage unit 402 includes an operation identification information storage unit 460 and an operation data storage unit 470.

The first production unit information acquisition unit 410 acquires the first production unit information from the molding management device 100.

The second production unit information acquisition unit 420 acquires the second production unit information from the molding management device 100.

The operation data acquisition unit 430 acquires molding machine operation data which is information on operation data of the injection molding machine 310.

The operation data storage control unit 440 causes the operation data storage unit 470 to store the molding machine operation data and operation identification information in association with each other. Here, the operation identification information is the first production unit information assigned with the second production unit information as information on a lower data hierarchy.

The shot identification information generation unit 450 generates shot identification information, which is information on a shot for injecting the molding material into the cavity, for each molding cycle. The shot identification information is identification information assigned to each shot. The shot identification information is, for example, an ID number assigned to each shot. The shot identification information is also referred to as a shot number. Here, each molding cycle means each time a shot is executed.

The operation identification information storage unit 460 stores the operation identification information.

The operation data storage unit 470 stores information in which the molding machine operation data and the operation identification information are associated with each other.

Figure 5:
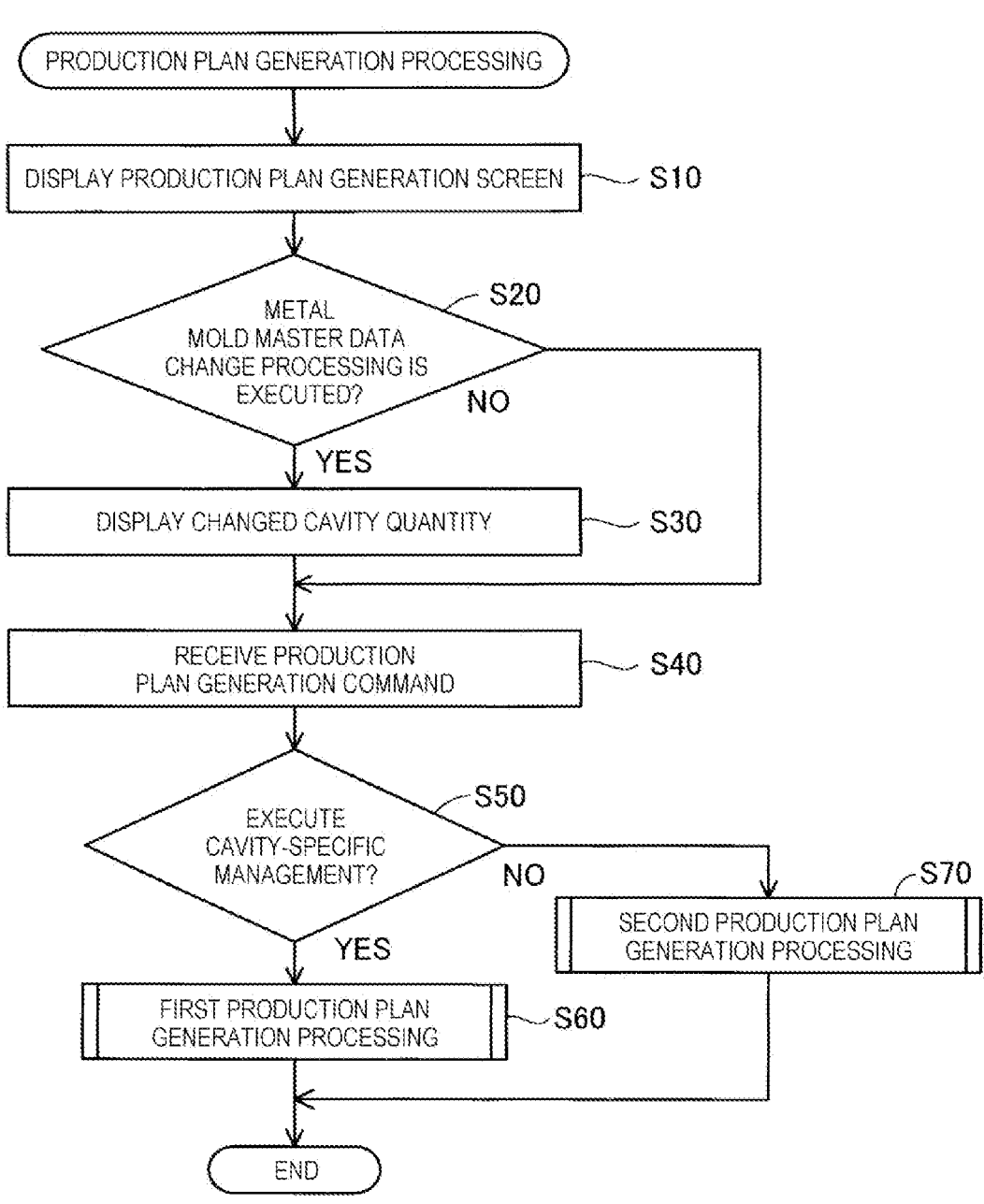
FIG. 5 is a diagram showing a process of production plan generation processing.

FIG. 5 is a diagram showing a process of production plan generation processing executed by the production plan generation unit 110. The production plan generation processing is processing of generating a production plan for producing molded articles using the injection molding machine 310.

In step S10, the production plan generation unit 110 generates a production plan generation screen SC1, which is a screen for the user to input detailed information on the production plan, and causes the display unit 60 to display the production plan generation screen SC1.

Figure 6:
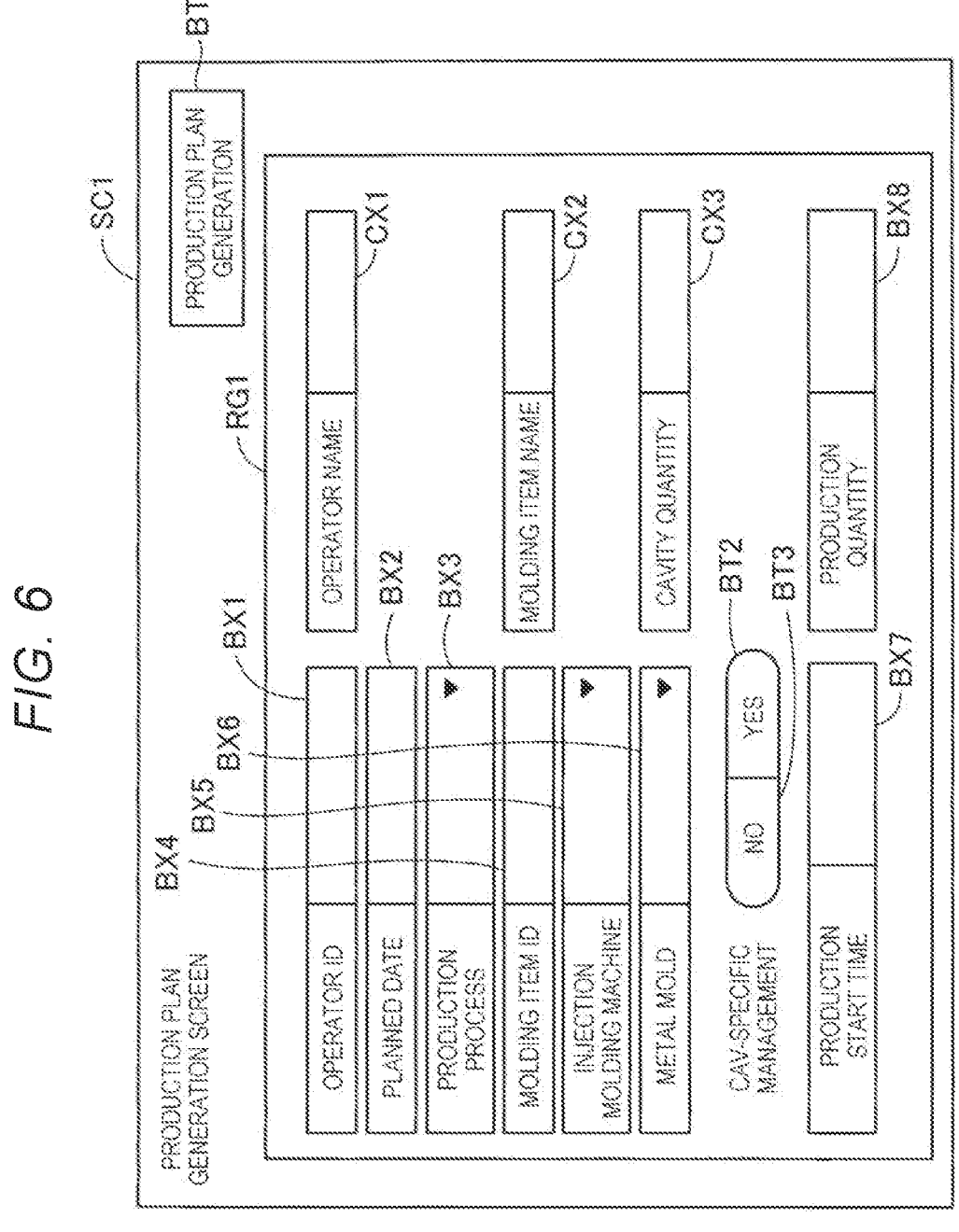
FIG. 6 is a diagram showing a production plan generation screen.

FIG. 6 is a diagram showing the production plan generation screen SC1. In step S10, the user inputs the detailed information on the production plan to the production plan generation screen SC1. The production plan generation screen SC1 is provided with a production plan input region RG1 and a production plan generation button BT1.

The production plan input region RG1 includes an input field BX1 for inputting an ID number of a user who creates the production plan, in input field BX2 for inputting a creation date of the production plan, an input field BX3 for inputting a production process, an input field BX4 for inputting an ID number of a molding item, an input field BX5 for inputting the injection molding machine 310 used for molding the molded article, an input field BX6 for inputting a metal mold attached to the injection molding machine 310 input to the input field BX5, an input field BX7 for inputting a production start time, an input field BX8 for inputting a production quantity of the molded articles, a display field CX1 for displaying a name of the user who creates the production plan, a display field CX2 for displaying a name of the molding item, a display field CX3 for displaying a cavity quantity of the metal mold input to the input field BX6, a CAV-specific management execution button BT2, and a CAV-specific management non-execution button BT3. Here, the production process is a process related to production of the molded article, and is, for example, a process of only molding the molded article, or a process of molding the molded article and inspecting the molded article.

The above-described respective pieces of information are input in the respective input fields BX1 to BX8 by the user. When the ID number of the user who creates the production plan is input in the input field BX1, the production plan generation unit 110 causes the display field CX1 to display the name of the user corresponding to the ID number of the user input in the input field BX1. When the ID number of the molding item is input in the input field BX4, the production plan generation unit 110 causes the display field CX2 to display the name of the molding item corresponding to the ID number of the molding item input in the input field BX4. When the metal mold is input in the input field BX6, the production plan generation unit 110 causes the display field CX3 to display the cavity quantity of the metal mold input in the input field BX6. The above-described correspondence relationship is stored in the master database in advance.

The CAV-specific management execution button BT2 is a button used when associating a manufacturing lot with a specific cavity. The CAV-specific management non-execution button BT3 is a button used when not associating a manufacturing lot with a specific cavity. Here, the expression associating a manufacturing lot with a specific cavity means that one manufacturing lot includes only molded articles molded in one cavity. The CAV-specific management execution button BT2 and the CAV-specific management non-execution button BT3 are provided such that the user can select either one of them. When associating a manufacturing lot with a specific cavity, the user selects the CAV-specific management execution button BT2. When not associating a manufacturing lot with a specific cavity, the user selects the CAV-specific management non-execution button BT3.

When the metal mold input in the input field BX6 has a plurality of cavities and there is an abnormality in at least a part of the plurality of cavities, the user selects the CAV-specific management execution button BT2 and changes the cavity quantity of the metal mold input in the input field BX6, which is stored in the master database. The abnormality of the cavity is, for example, attachment of a carbonized material to a part of cavities, or deformation of a part of cavities. The cavity quantity of the metal mold stored in the master database is changed by the production plan generation unit 110 executing metal mold master data change processing.

Figure 7:
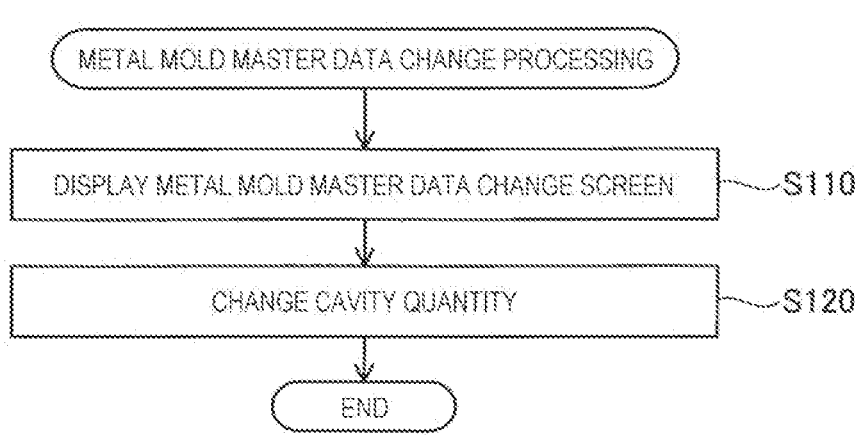
FIG. 7 is a diagram showing a process of metal mold master data change processing.

FIG. 7 is a diagram showing a process of the metal mold master data change processing executed by the production plan generation unit 110. The metal mold master data change processing is executed when the user changes the cavity quantity of the metal mold stored in the master database.

In step S110, the production plan generation unit 110 generates a metal mold master data change screen SC2, which is a screen for the user to change the cavity quantity of the metal mold, and causes the display unit 60 to display the metal mold master data change screen SC2. The metal mold master data change screen SC2 is displayed on the display unit 60 when the user executes a predetermined operation.

Figure 8:
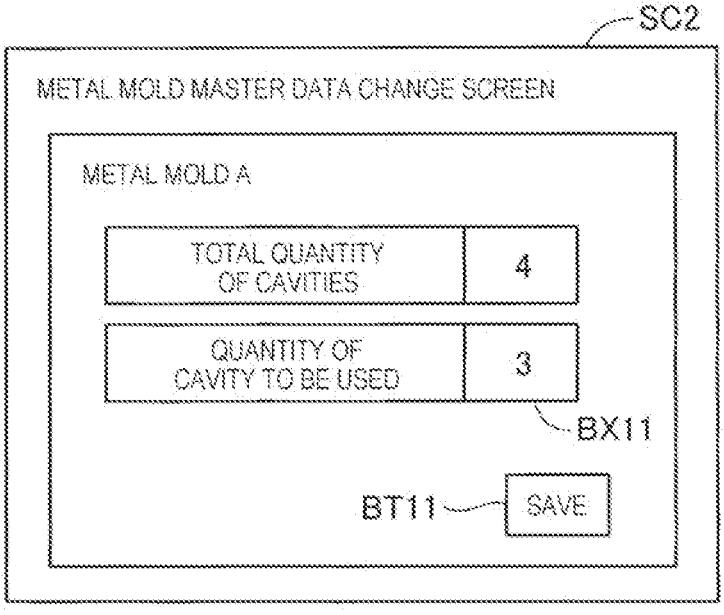
FIG. 8 is a diagram showing a metal mold master data change screen.

FIG. 8 is a diagram showing the metal mold master data change screen SC2. The name of the metal mold input in the input field BX6 on the production plan generation screen SC1 shown in FIG. 6 and a quantity of all cavities of the metal mold are displayed on the metal mold master data change screen SC2. The metal mold master data change screen SC2 is provided with a cavity quantity input field BX11 and a save button BT11. In step S110, the user inputs, in the cavity quantity input field BX11, a quantity of cavities to be used for molding the molded articles among the cavities of the metal mold displayed on the metal mold master data change screen SC2, and clicks the save button BT11. For example, the user inputs a quantity of the cavities without abnormality in the cavity quantity input field BX11.

In step S120 in FIG. 7, the production plan generation unit 110 changes the cavity quantity of the metal mold displayed on the metal mold master data change screen SC2 to a value input in the cavity quantity input field BX11 in step S110, and stores the changed cavity quantity in the master database. As described above, the metal mold master data change processing is executed.

In step S20 in FIG. 5, the production plan generation unit 110 determines whether the metal mold master data change processing is executed. When the metal mold master data change processing is executed, in step S30, the production plan generation unit 110 causes the display field CX3 on the production plan generation screen SC1 shown in FIG. 6 to display the changed cavity quantity of the metal mold input in the input field BX6.

In step S40, the production plan generation unit 110 receives a production plan generation command from the user. The production plan generation unit 110 receives the production plan generation command when the production plan generation button BT1 is clicked in a state where information is input from the input field BX1 to the input field BX8 on the production plan generation screen SC1 and either one of the CAV-specific management execution button BT2 or the CAV-specific management non-execution button BT3 is selected.

In step S50, the production plan generation unit 110 determines whether to execute cavity-specific management. Here, executing the cavity-specific management means associating the manufacturing lot with cavity information, and not executing the cavity-specific management means not associating the manufacturing lot with the cavity information. When the production plan generation button BT1 is clicked in a state where the CAV-specific management execution button BT2 is selected, the production plan generation unit 110 determines to execute the cavity-specific management. In this case, first production plan generation processing is executed in step S60. When the production plan generation button BT1 is clicked in a state where the CAV-specific management non-execution button BT3 is selected, the production plan generation unit 110 determines not to execute the cavity-specific management. In this case, second production plan generation processing is executed in step S70.

Figures 9, 10:
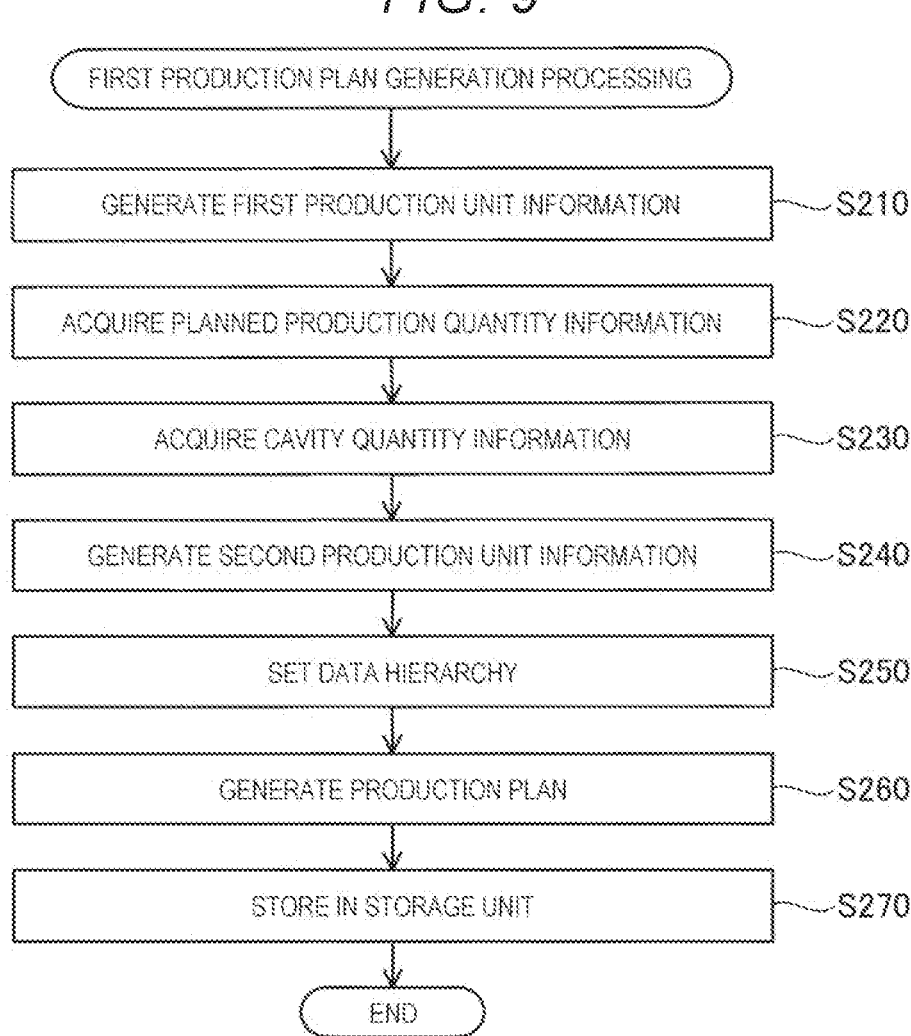
FIG. 9 is a diagram showing a process of first production plan generation processing.
FIG. 10 is a diagram showing a hierarchical structure of a job ID and lot IDs.

FIG. 9 is a diagram showing a process of the first production plan generation processing executed by the production plan generation unit 110. The first production plan generation processing is processing of generating a production plan in which the manufacturing lot and the cavity information are associated with each other.

In step S210, the first production unit information generation unit 210 generates the job ID, which is the first production unit information.

In step S220, the third acquisition unit 230 acquires, as the planned production quantity information, the production quantity of the molded articles input in the input field BX8 on the production plan generation screen SC1 shown in FIG. 6.

In step S230, the fourth acquisition unit 240 acquires, as the cavity quantity information, the cavity quantity displayed in the display field CX3 on the production plan generation screen SC1 shown in FIG. 6.

In step S240, the second production unit information generation unit 220 generates the lot ID, which is the second production unit information. The second production unit information generation unit 220 determines a quantity of the manufacturing lots using the planned production quantity information acquired by the third acquisition unit 230 and the cavity quantity information acquired by the fourth acquisition unit 240, and assigns the lot ID to each manufacturing lot. The second production unit information generation unit 220 associates a lot ID with a specific cavity. That is, the second production unit information generation unit 220 associates the manufacturing lot with the specific cavity so that one manufacturing lot includes only the molded articles molded in one cavity. The quantity of manufacturing lots constituted with the molded articles molded in one cavity may be one or plural. That is, the second production unit information generation unit 220 may generate one lot ID for each cavity or may generate a plurality of lot IDs for each cavity.

In step S250, the data hierarchy setting unit 250 sets the lot ID generated by the second production unit information generation unit 220 in step S240 as information on a lower data hierarchy than the job ID generated by the first production unit information generation unit 210 in step S210.

In step S260, the plan generation unit 260 generates the production plan based on the job ID generated by the first production unit information generation unit 210, the lot ID generated by the second production unit information generation unit 220, the planned production quantity information acquired by the third acquisition unit 230, and the cavity quantity information acquired by the fourth acquisition unit. In the embodiment, the production plan includes a planned shot quantity which is a planned number of times of injecting the molding material into the cavity, and a planned production time which is a time required to produce the molded articles.

The plan generation unit 260 first calculates the planned shot quantity. The plan generation unit 260 calculates a planned shot quantity per molding job and a planned shot quantity per manufacturing lot. The planned shot quantity per molding job is a shot quantity to be executed in the molding job of the job ID generated by the first production unit information generation unit 210. The planned shot quantity per manufacturing lot is a shot quantity required for production of the molded articles constituting the manufacturing lot of each lot ID generated by the second production unit information generation unit 220.

The planned shot quantity per molding job is calculated by the following equation (1). Here, the planned production quantity is a numerical value acquired by the third acquisition unit 230, and the cavity quantity is a numerical value acquired by the fourth acquisition unit 240.

$$\text{(Planned shot quantity per molding job)=(planned production quantity)}\div\text{(cavity quantity)} \tag{1}$$

The planned shot quantity per manufacturing lot is calculated by the following equation (2).

$$\text{(Planned shot quantity per manufacturing lot)=(quantity of molded articles constituting each manufacturing lot)} \tag{2}$$

Next, the plan generation unit 260 calculates the planned production time using the planned shot quantity and a cycle time of one shot which is a time between two consecutive shots. The plan generation unit 260 calculates a planned production time per molding job and a planned production time per manufacturing lot. The planned production time per molding job is a time required for molding all molded articles molded by the molding job of the job ID generated by the first production unit information generation unit 210.

The planned production time per manufacturing lot is a time required for molding all molded articles constituting the manufacturing lot of each lot ID generated by the second production unit information generation unit 220.

The planned production time per molding job is calculated by the following equation (3). Here, the cycle time of one shot may be stored in the master database in advance, or may be an average value of times between two consecutive shots.

$$\begin{aligned}\text{(Planned production time per molding job)=(planned}\\ \text{shot quantity per molding job)}\times\text{(cycle time of}\\ \text{one shot)}\end{aligned}\qquad(3)$$

The planned production time per manufacturing lot is calculated by the following equation (4).

$$\begin{aligned}\text{(Planned production time per manufacturing lot)=}\\ \text{(planned shot quantity per manufacturing lot)}\times\\ \text{(cycle time of one shot)}\end{aligned}\qquad(4)$$

The plan generation unit 260 may calculate the planned shot quantity per molding job and the planned shot quantity per manufacturing lot by dividing the planned shot quantity per molding job calculated by the equation (1) and the planned shot quantity per manufacturing lot calculated by the equation (2) by a non-defect rate of the molded article, in consideration of a case where a defective product is produced. The plan generation unit 260 may calculate the planned shot quantity per manufacturing lot and the planned production time per manufacturing lot by dividing the planned production time per molding job calculated by the equation (3) and the planned production time per manufacturing lot calculated by the equation (4) by an operation rate of the injection molding machine 310, in consideration of a time during which the injection molding machine 310 abnormally stops.

In step S270, the production plan generation unit 110 causes the production database to store the job ID generated in step S210, the lot ID generated in step S240, and the planned shot quantity per molding job, the planned shot quantity per manufacturing lot, the planned production time per molding job, and the planned production time per manufacturing lot, which are calculated in step S260, in association with one another. That is, the production plan generation unit 110 causes the production database to store the job ID, the lot ID, and the production plan in association with one another. At this time, as set by the data hierarchy setting unit 250, the production plan generation unit 110 causes the production database to store the lot ID in association with the job ID as information on a lower data hierarchy than the job ID.

FIG. 10 is a diagram showing a hierarchical structure of the job ID and the lot IDs, which are stored in the production database. In FIG. 10, the left side indicates an upper data hierarchy, and the right side indicates a lower data hierarchy. In an example shown in FIG. 10, three lot IDs are stored as information on a lower data hierarchy for one job ID. As shown in FIG. 10, the production plan generation unit 110 causes the production database to store the lot IDs as the information on the lower data hierarchy for the job ID. As described above, the first production plan generation processing is executed.

Figure 11:
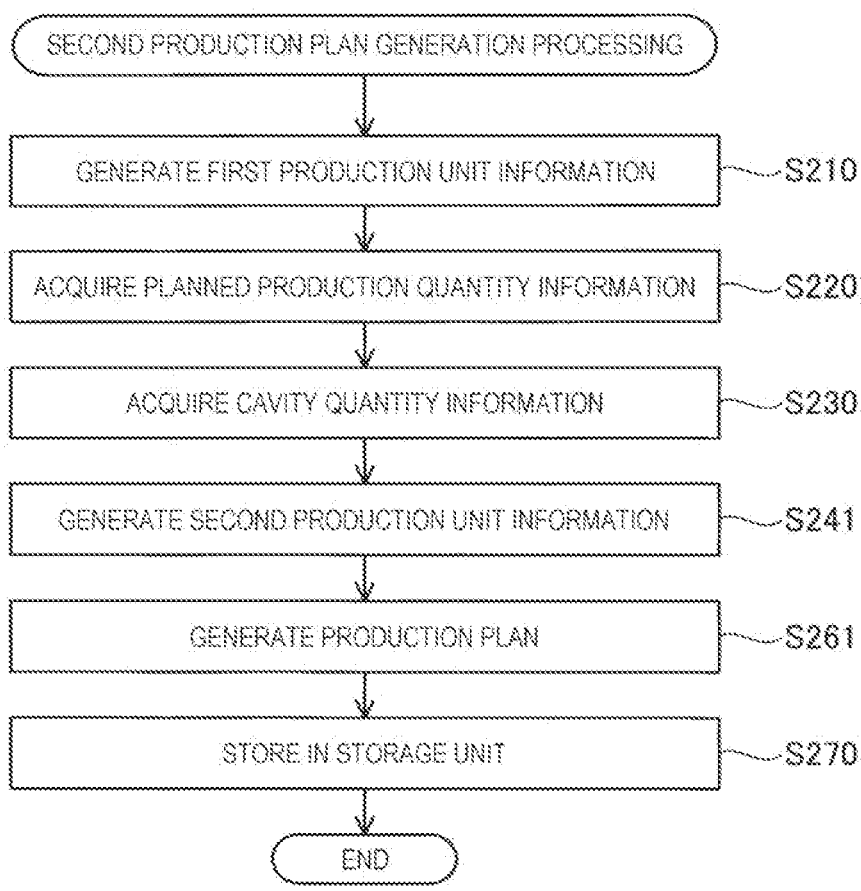
FIG. 11 is a diagram showing a process of second production plan generation processing.

FIG. 11 is a diagram showing a process of the second production plan generation processing executed by the production plan generation unit 110. The second production plan generation processing is processing of generating a production plan in which the manufacturing lot is not associated with the cavity information. The same reference numerals are given to a portion where the processing same as the first production plan generation processing shown in FIG. 9 is executed, and description thereof will be omitted.

In step S241, the second production unit information generation unit 220 generates a lot ID, which is the second production unit information. The second production unit information generation unit 220 determines a quantity of the manufacturing lots using the planned production quantity information acquired by the third acquisition unit 230 and the cavity quantity information acquired by the fourth acquisition unit 240, and assigns the lot ID to each manufacturing lot. The second production unit information generation unit 220 does not associate the lot ID with the specific cavity. That is, the second production unit information generation unit 220 does not make one manufacturing lot include only molded articles molded in one cavity. In this case, one manufacturing lot includes molded articles molded in a plurality of cavities.

In step S261, the plan generation unit 260 generates a production plan. The plan generation unit 260 calculates a planned shot quantity per molding job using the equation (1), as in step S260 of the first production plan generation processing. The plan generation unit 260 calculates a planned production time per molding job using the equation (3), as in step S260 of the first production plan generation processing. As described above, the second production plan generation processing is executed.

Figure 12:
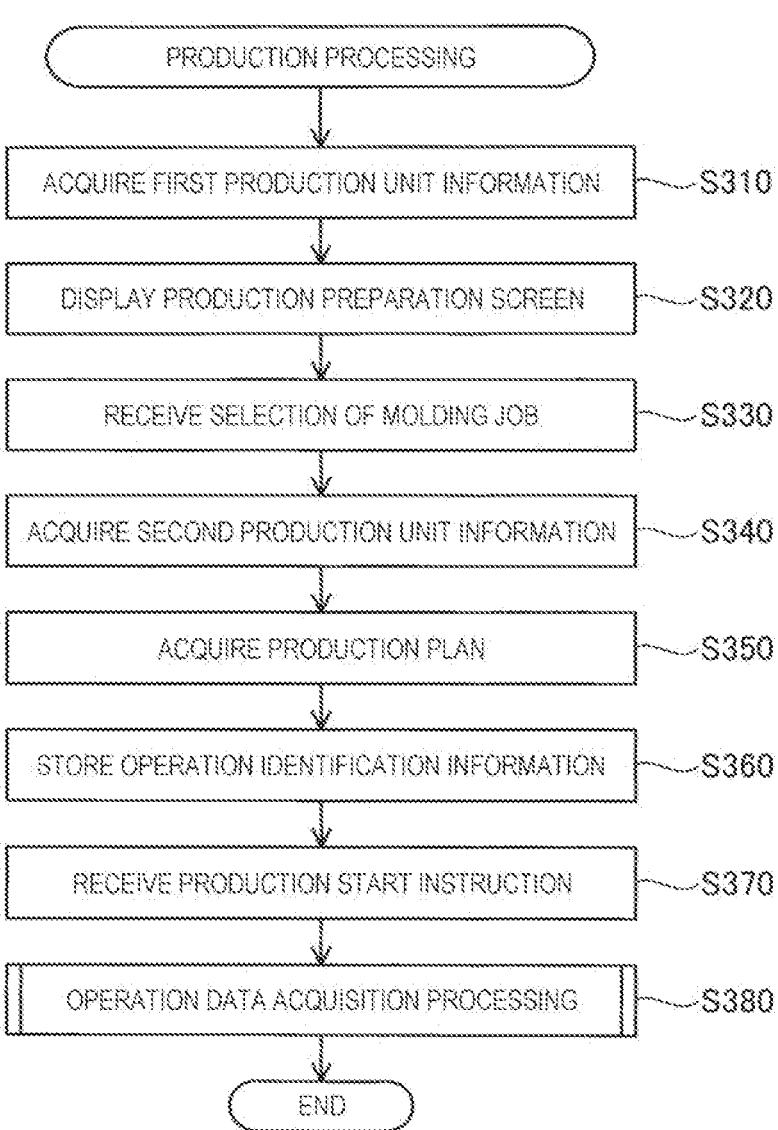
FIG. 12 is a diagram showing a process of production processing.

FIG. 12 is a diagram showing a process of production processing executed by the molding machine control device 350. The production processing is executed when the molded article is produced by the injection molding machine 310.

In step S310, the first production unit information acquisition unit 410 acquires the job ID, which is the first production unit information, from the molding management device 100. Here, the job ID acquired by the first production unit information acquisition unit 410 is a job ID that is generated when the production plan generation unit 110 of the molding management device 100 generates a production plan and is stored in the production database. The first production unit information acquisition unit 410 acquires the job ID of the molding job used for molding the molded article by the injection molding machine 310 controlled by the molding machine control device 350 including the first production unit information acquisition unit 410.

In step S320, the molding machine processing unit 401 generates a production start screen SC3, which is a screen for the user to select a molding job and start molding a molded article, and causes the molding machine display unit 360 to display the production start screen SC3.

Figure 13:
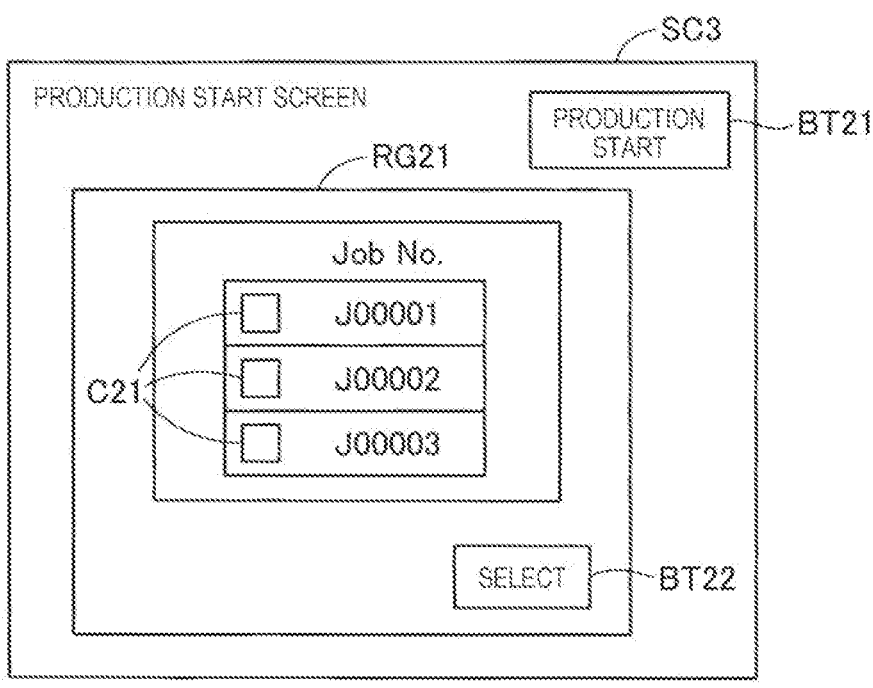
FIG. 13 is a diagram showing a production start screen.

FIG. 13 is a diagram showing the production start screen SC3. In step S320, the user selects the molding job to be executed by the injection molding machine 310 using the production start screen SC3.

The production start screen SC3 is provided with a molding job selection region RG21 and a production start button BT21. The job ID acquired by the first production unit information acquisition unit 410 in step S310 is displayed in the molding job selection region RG21. The molding job selection region RG21 is provided with a selection button BT22 and a check box C21 for selecting the molding job associated with each job ID.

In step S330 in FIG. 12, the molding machine processing unit 401 receives a selection of the molding job from the user. The user selects the check box C21 corresponding to the molding job to be executed by the injection molding machine 310 among the molding jobs displayed in the molding job selection region RG21 on the production start screen SC3 shown in FIG. 13, and clicks the selection button BT22.

In step S340 in FIG. 12, the second production unit information acquisition unit 420 acquires the lot ID, which is the second production unit information, from the molding management device 100. Here, the lot ID acquired by the second production unit information acquisition unit 420 is a lot ID stored in the production database of the molding management device 100 as information on a lower data hierarchy than the job ID selected in step S330.

In step S350, the molding machine processing unit 401 acquires, from the molding management device 100, the production plan stored in association with the job ID selected in step S330 and the lot ID acquired by the second production unit information acquisition unit 420 in step S340. Specifically, the molding machine processing unit 401 acquires, from the production database of the molding management device 100, the planned shot quantity per molding job, the planned shot quantity per manufacturing lot, the planned production time per molding job, and the planned production time per manufacturing lot, which are stored in association with the above-described job ID and lot ID.

In step S360, the molding machine processing unit 401 causes the operation identification information storage unit 460 to store the operation identification information assigned with the lot ID acquired by the second production unit information acquisition unit 420 in step S340 as information on a lower data hierarchy than the job ID selected in step S330.

In step S370, the molding machine processing unit 401 receives a molded article production start instruction from the user. The user clicks the production start button BT21 on the production start screen SC3 shown in FIG. 13. When the production start button BT21 is clicked, the molding machine processing unit 401 transmits the command to the injection molding machine 310 to produce the molded articles based on the molding job selected in step S330.

In step S380, operation data acquisition processing is executed. The operation data acquisition processing is processing of acquiring the molding machine operation data when the injection molding machine 310 molds the molded articles.

Figure 14:
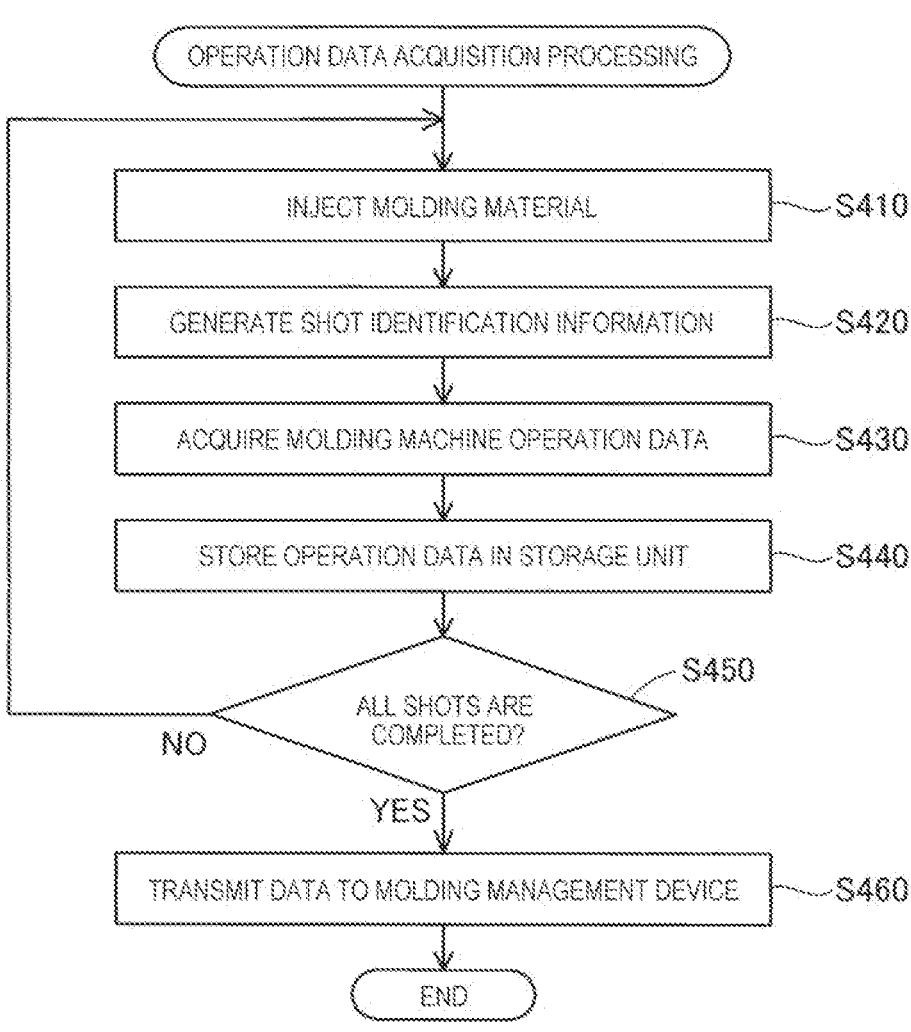
FIG. 14 is a diagram showing a process of operation data acquisition processing.

FIG. 14 is a diagram showing a process of the operation data acquisition processing executed by the molding machine control device 350.

In step S410, the molding machine control device 350 controls the material dispensing unit 330 and the mold clamping device 340 to inject the molding material into the cavity of the mold 370. That is, in step S410, a shot is executed once.

In step S420, the shot identification information generation unit 450 generates shot identification information corresponding to the shot executed in step S410.

In step S430, the operation data acquisition unit 430 acquires molding machine operation data related to the shot executed in step S410. The molding machine operation data includes, for example, a temperature and an injection pressure of the molding material, a mold clamping force of the mold clamping device 340, and a temperature of the metal mold when the shot is executed.

In step S440, the operation data storage control unit 440 causes the operation data storage unit 470 to store the molding machine operation data acquired by the operation data acquisition unit 430 in step S430 and the operation identification information stored in the operation identification information storage unit 460 in step S360 of the production processing in association with each other. The operation data storage control unit 440 causes the operation data storage unit 470 to store the shot identification information generated in step S420 and the operation identification information stored in the operation identification information storage unit 460 in step S360 of the production processing in association with each other. The operation data storage control unit 440 may cause the operation data storage unit 470 to store the molding machine operation data and the operation identification information of each shot in association with each other after the molding job is completed, rather than each time the shot is executed. Further, the operation data storage control unit 440 may cause the operation data storage unit 470 to store the shot identification information and the operation identification information of each shot in association with each other after the molding job is completed, rather than each time the shot is executed.

In step S450, the molding machine processing unit 401 determines whether the planned number of times of shots are executed in the molding job currently being executed. When the predetermined number of times of shots are not executed, the molding machine processing unit 401 returns the processing to step S410.

In step S460, the molding machine processing unit 401 transmits, to the molding management device 100, the operation identification information stored in the operation identification information storage unit 460 in step S360 of the production processing, the shot identification information generated in step S420, and the molding machine operation data acquired in step S430 in association with one another. The molding machine processing unit 401 may transmit the above-described information to the molding management device 100 each time the shot is executed, or may transmit the above-described information to the molding management device 100 each time the predetermined number of times of shots are executed. As described above, the operation data acquisition processing is executed.

Figure 15:
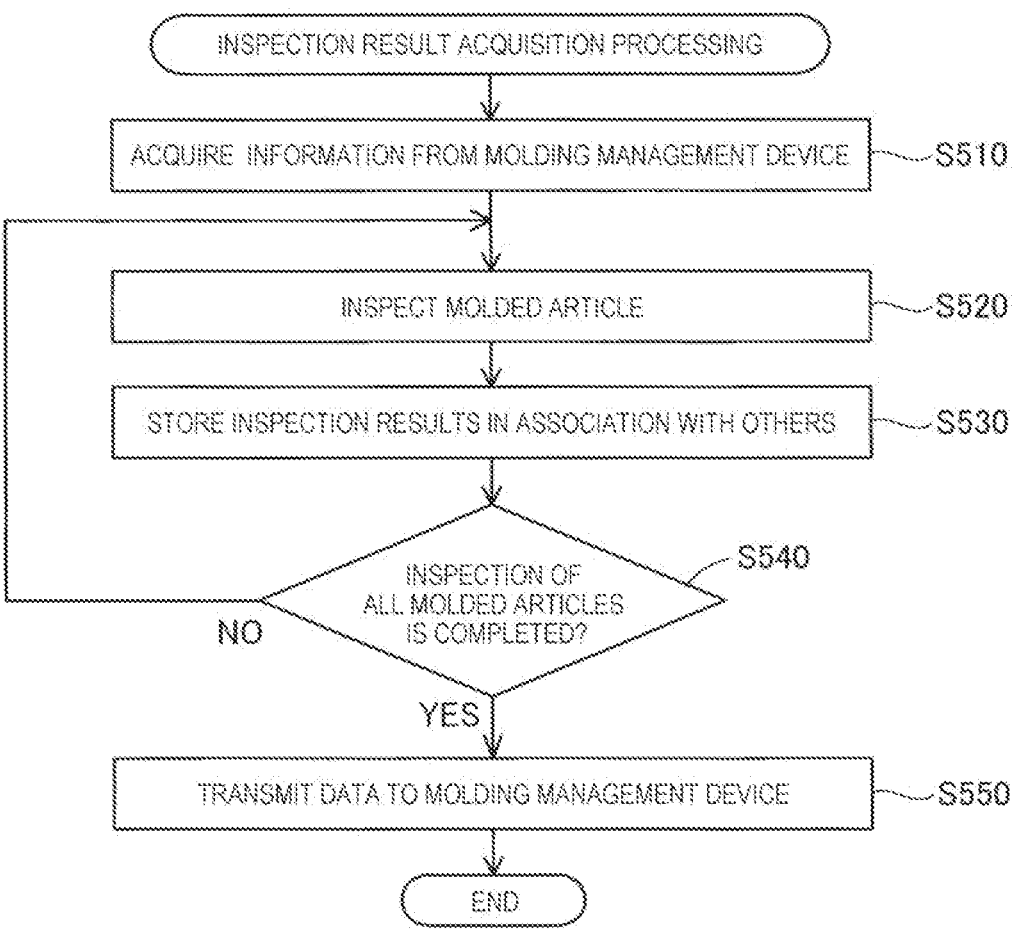
FIG. 15 is a diagram showing a process of inspection result acquisition processing.

FIG. 15 is a diagram showing a process of inspection result acquisition processing executed by the inspection device 320. The inspection result acquisition processing is processing in which the inspection device 320 inspects the molded article molded by the injection molding machine 310 in the operation data acquisition processing shown in FIG. 14 and acquires an inspection result thereof. The inspection result acquisition processing may be executed in parallel with the operation data acquisition processing, or may be executed after the operation data acquisition processing is completed.

In step S510, the first control unit 321 acquires, from the molding management device 100, the job ID of the molding job in which the molded article to be inspected by the inspection device 320 is produced, the lot ID of the molded article to be inspected by the inspection device 320, and the shot identification information that is associated with the above-described job ID and lot ID and is transmitted from the injection molding machine 310 to the molding management device 100 in step S460 of the operation data acquisition processing.

In step S520, the first control unit 321 controls the inspection device 320 to inspect the molded article, and determines whether the molded article is defective.

In step S530, the first control unit 321 stores the job ID, the lot ID, and the shot identification information, which are acquired in step S510, and the inspection result of the molded article obtained in step S520 in association with one another.

In step S540, the first control unit 321 determines whether inspection of all the molded articles molded by the injection molding machine 310 in the operation data acquisition processing is completed. When the inspection of all the molded articles is not completed, the first control unit 321 returns the processing to step S520.

In step S550, the first control unit 321 transmits, to the molding management device 100, the job ID, the lot ID, and the shot identification information, which are acquired in step S510, and the inspection result of the molded article obtained in step S520 in association with one another. The first control unit 321 may transmit the above-described information to the molding management device 100 each time inspection of one molded article is completed, or may transmit the above-described information to the molding management device 100 each time inspection of a predetermined quantity of molded articles is completed. As described above, the inspection result acquisition processing is executed.

Figure 16:
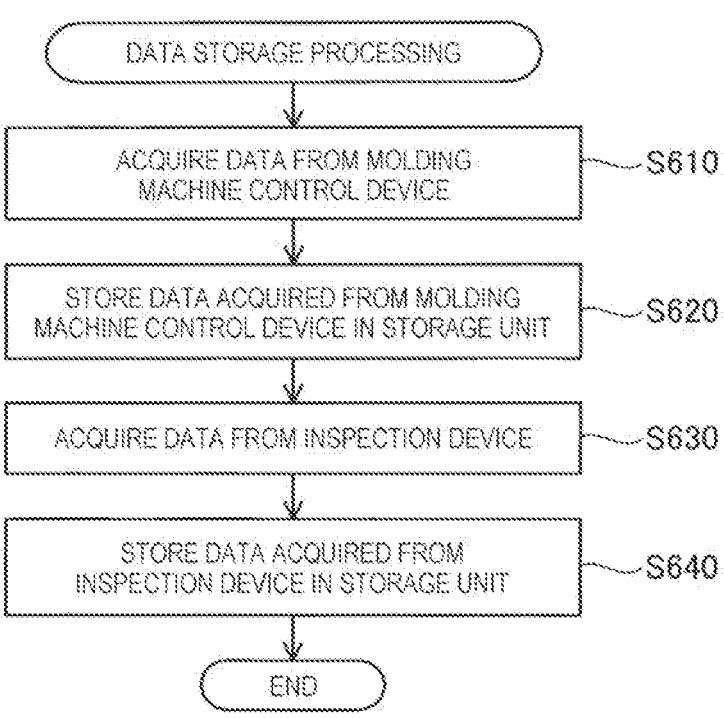
FIG. 16 is a diagram showing a process of data storage processing.

FIG. 16 is a diagram showing a process of data storage processing executed by the molding management device 100. The data storage processing is processing executed when the molding management device 100 stores, in the storage unit 102, data transmitted from the molding machine control device 350 and the first control unit 321 of the inspection device 320. The data storage processing is executed after the operation data acquisition processing shown in FIG. 14 and the inspection result acquisition processing shown in FIG. 15 are completed. When the data is transmitted from the injection molding machine 310 to the molding management device 100 each time the shot is executed in the operation data acquisition processing, the data storage processing may be executed in parallel with the operation data acquisition processing. When the data is transmitted from the inspection device 320 to the molding management device 100 each time inspection of one molded article is completed in the inspection result acquisition processing, the data storage processing may be executed in parallel with the inspection result acquisition processing.

In step S610 of the data storage processing shown in FIG. 16, the first acquisition unit 120 acquires the shot identification information transmitted from the molding machine control device 350 in step S460 of the operation data acquisition processing. In step S610, the second acquisition unit 130 acquires the molding machine operation data transmitted from the molding machine control device 350 in step S460 of the operation data acquisition processing. In step S610, the processing unit 101 acquires the operation identification information transmitted from the molding machine control device 350 in step S460 of the operation data acquisition processing.

In step S620, the processing unit 101 searches the lot ID stored in the production database for a lot ID equal to the lot ID included in the operation identification information acquired from the molding machine control device 350 in step S610. Then, the processing unit 101 causes the production database to store the shot identification information and the molding machine operation data, which are acquired from the molding machine control device 350 in step S610 and associated with the operation identification information including the above-described lot ID, in association with the above-described lot ID. That is, the processing unit 101 causes the production database to store the lot ID, the shot identification information, and the molding machine operation data in association with one another. At this time, the processing unit 101 causes the production database to store the shot identification information as information on a lower data hierarchy than the above-described lot ID.

Figure 17:
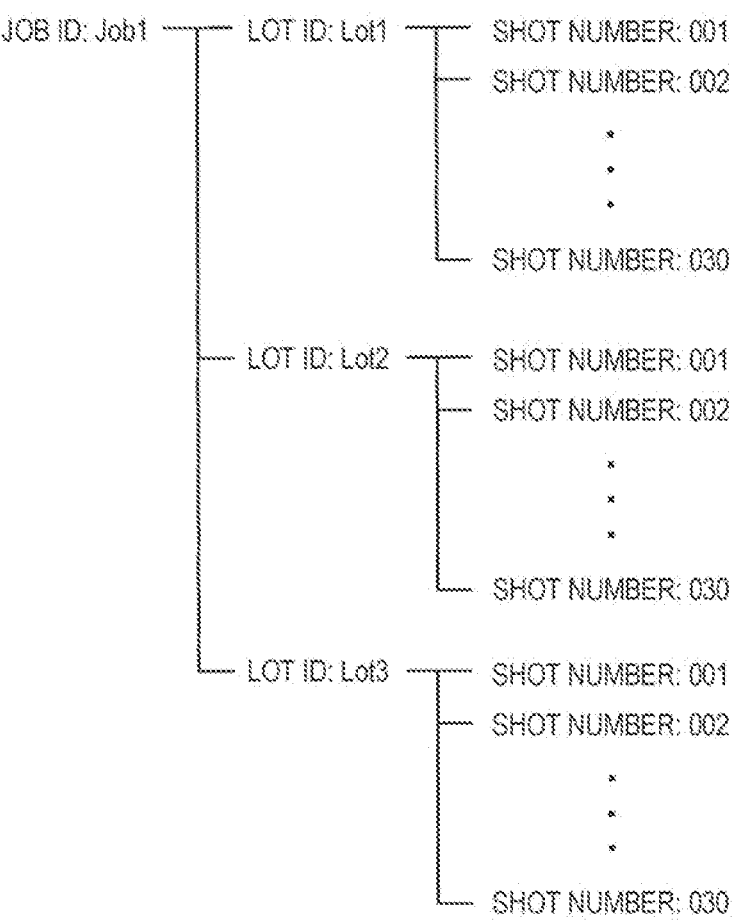
FIG. 17 is a diagram showing a hierarchical structure of the job ID, the lot IDs, and shot identification information.

FIG. 17 is a diagram showing a hierarchical structure of the job ID, the lots ID, and the shot identification information, which are stored in the production database. In FIG. 17, the left side indicates an upper data hierarchy, and the right side indicates a lower data hierarchy. In an example showing in FIG. 17, shot numbers, which are 30 pieces of shot identification information, are stored as information on a lower data hierarchy than each lot ID. As shown in FIG. 17, the processing unit 101 causes the production database to store the shot identification information as information on a lower data hierarchy than the lot ID.

In step S630 in FIG. 16, the first acquisition unit 120 acquires the shot identification information transmitted from the inspection device 320 in step S550 of the inspection result acquisition processing. In step S630, the second acquisition unit 130 acquires the inspection result transmitted from the inspection device 320 in step S550 of the inspection result acquisition processing. In step S630, the processing unit 101 acquires the job ID and the lot ID, which are transmitted from the inspection device 320 in step S550 of the inspection result acquisition processing.

In step S640, the processing unit 101 searches the lot ID stored in the production database for a lot ID equal to the lot ID acquired from the inspection device 320 in step S630. The processing unit 101 causes the production database to store the shot identification information and the inspection result, which are associated with the above-described lot ID and acquired from the inspection device 320 in step S630, in association with the above-described lot ID. That is, the processing unit 101 causes the storage unit 102 to store the lot ID, the shot identification information, and the inspection result in association with one another.

In other words, in step S620 and step S640, the processing unit 101 causes the production database to store the lot ID, the shot identification information, and the molded article information in association with one another. Accordingly, the job ID, the lot ID, the shot identification information, and the molded article information are stored in the production database in association with one another. As described above, the data storage processing is executed.

In the first embodiment described above, in the first production plan generation processing shown in FIG. 9, the second production unit information generation unit 220 generates the lot ID associated with the specific cavity, associates the manufacturing lot with the specific cavity, and makes one manufacturing lot include only molded articles molded in one cavity. Therefore, when the production plan generated in the first production plan generation processing is executed and the manufacturing lot is produced, the molded articles constituting the produced manufacturing lot are molded articles molded in one cavity.

In the embodiment, in the data storage processing shown in FIG. 16, the shot identification information acquired from the molding machine control device 350 is stored in the production database of the molding management device 100 as the information on the lower data hierarchy than the lot ID. In the data storage processing, the job ID, the lot ID, the shot identification information, and the molded article information are stored in the production database in association with one another.

Figure 18:
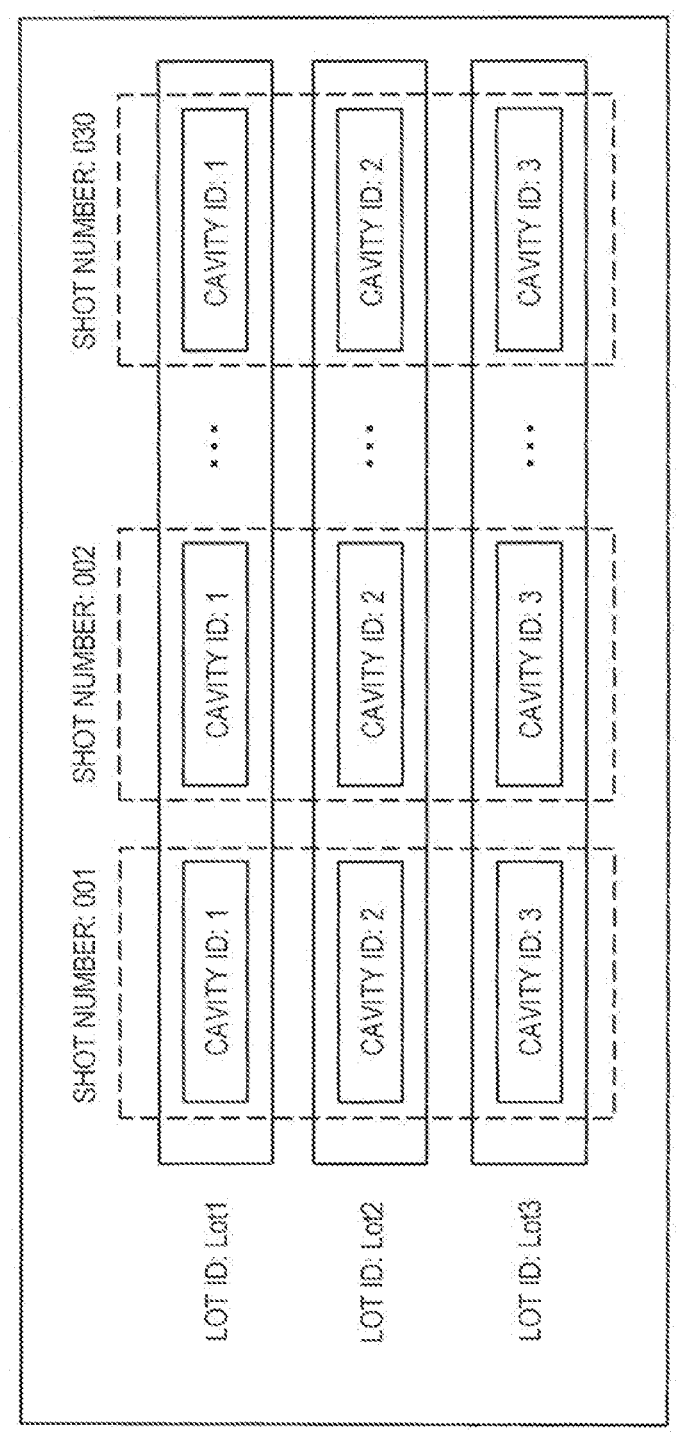
FIG. 18 is a diagram showing a relationship among the job ID, the lot IDs, and the shot identification information.

FIG. 18 is a diagram showing a relationship among the job ID, the lot IDs, and the shot identification information in the embodiment. In an example shown in FIG. 18, a manufacturing lot with a lot ID Lot1 is associated with a cavity with a cavity ID 1. The manufacturing lot with the lot ID Lot1 includes molded articles formed by shots with shot numbers 001 to 030 in the cavity with the cavity ID 1. That is, the manufacturing lot with the lot ID Lot1 includes only molded articles molded in the cavity with the cavity ID 1. Hereinafter, the manufacturing lot with the lot ID Lot1 is referred to as Lot1, the shot with the shot number 001 is referred to as a shot 001, and the cavity with the cavity ID 1 is referred to as a cavity 1. The same applies to other numbers. Similar to Lot1, Lot2 includes only molded articles molded in a cavity 2. Further, Lot 3 includes only molded articles molded in a cavity 3.

Figure 19:
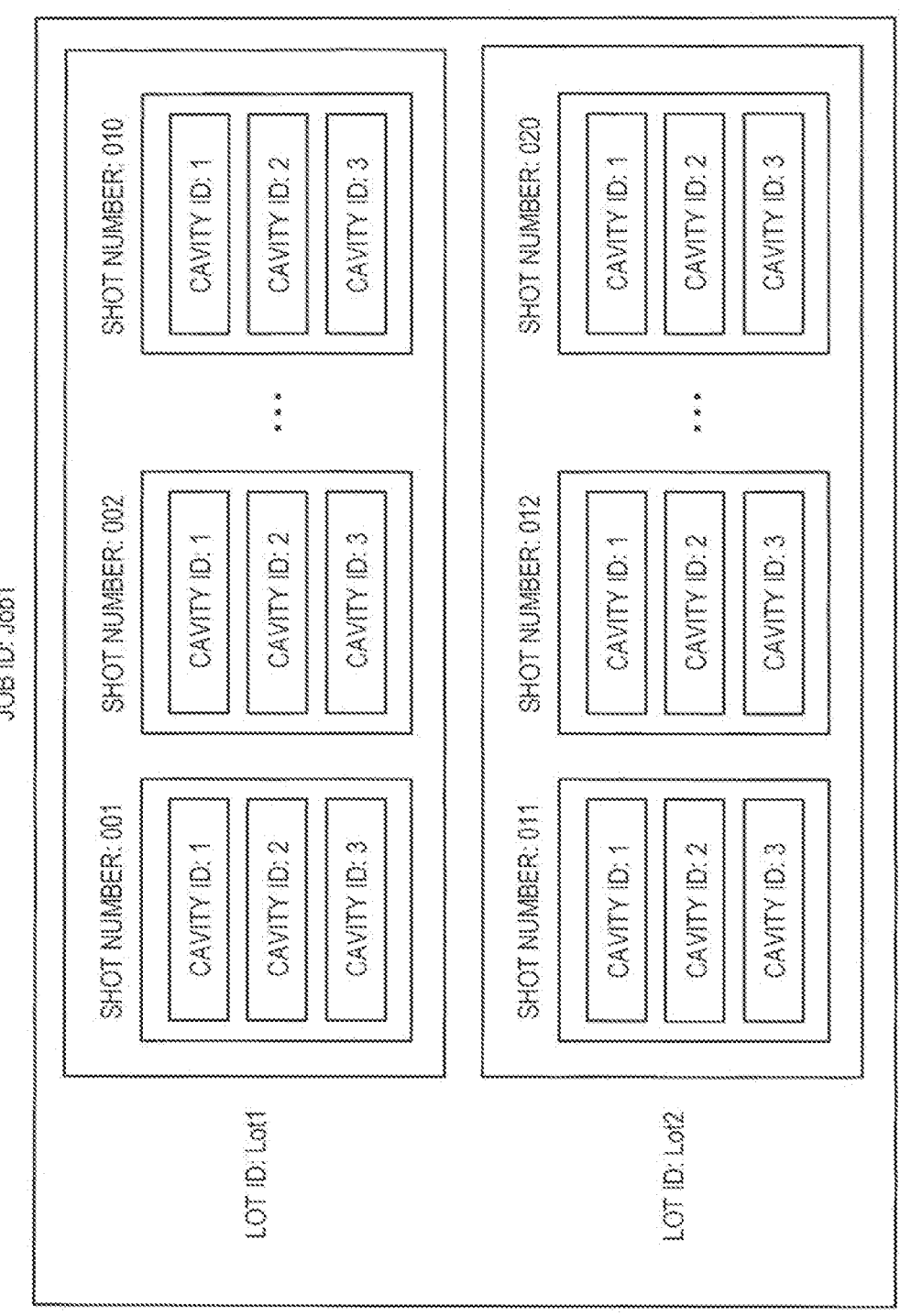
FIG. 19 is a diagram showing a relationship among the job ID, the lot IDs, and the shot identification information in a general molded article management system.

FIG. 19 is a diagram showing a relationship among the job ID, the lot IDs, and the shot identification information in a general molded article management system. As shown in FIG. 19, in the general molded article management system, the manufacturing lot is not associated with the specific cavity. That is, the lot ID is not associated with the specific cavity. In an example shown in FIG. 19, Lot1 includes molded articles molded by the shots with the shot numbers 001 to 010 in the cavity 1, the cavity 2, and the cavity 3. That is, Lot1 includes molded articles molded by a plurality of cavities. Similar to Lot1, Lot2 and Lot3 (not shown) each also include molded articles molded by a plurality of cavities.

Figure 20:
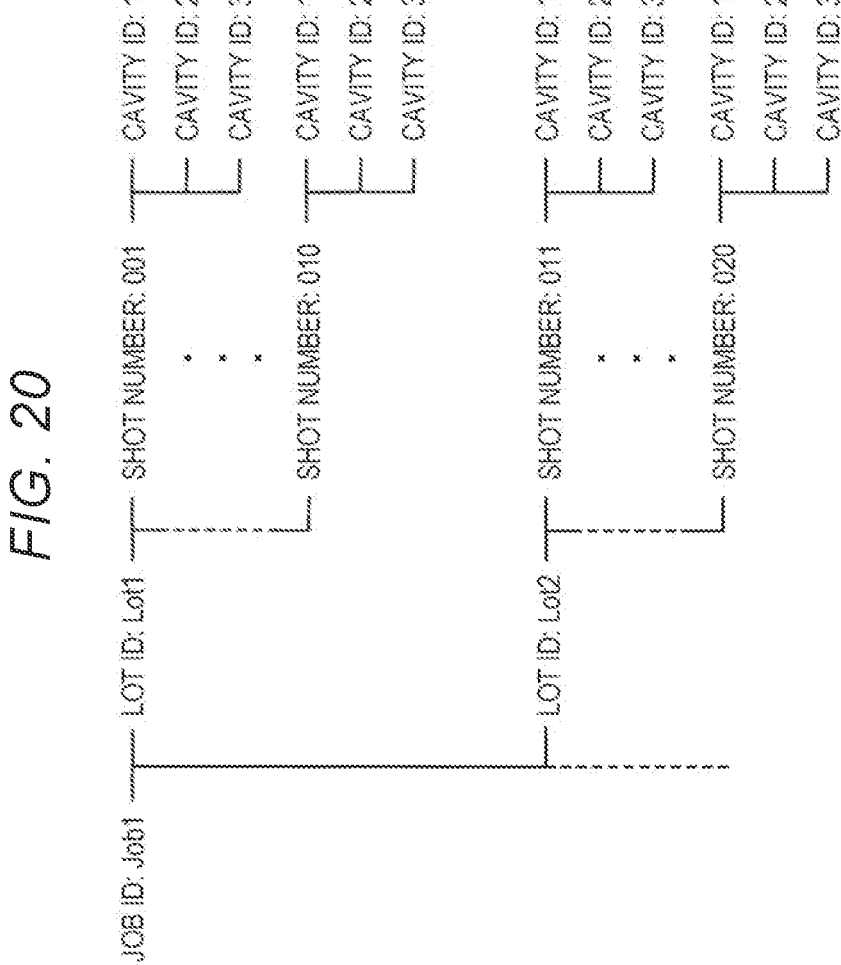
FIG. 20 is a diagram showing an example of a hierarchical structure of the job ID, the lot IDs, the shot identification information, and cavity identification information in a general molded article management system.

FIG. 20 is a diagram showing an example of a hierarchical structure of the job ID, the lot IDs, the shot identification information, and the cavity identification information which is information for identifying the cavity, which are stored in the database, in a general molded article management system. In FIG. 20, the left side indicates an upper data hierarchy, and the right side indicates a lower data hierarchy. As shown in the example in FIG. 20, in the general molded article management system, a database is caused to store the lot ID as information on a lower data hierarchy than the job ID, to store the shot identification information as information on a lower data hierarchy than the lot ID, and to store the cavity identification information as information on a lower data hierarchy than the shot identification information.

In the general molded article management system as shown in FIG. 20, for example, when processing of suspending shipping of all molded articles molded in a cavity in which an abnormality is detected or processing of discarding a molded article is executed, the cavity identification information indicating the cavity in which the abnormality is detected, among the cavity identification information stored as information on a lower data hierarchy than each shot identification information, may be acquired and a data set including only molded articles molded in the cavity in which the abnormality is detected may be generated.

In contrast to the above-described general molded article management system described above, in the embodiment, the lot ID is associated with the specific cavity. In the embodiment, as shown in FIG. 17, the shot identification information is stored in the production database as the information on the lower data hierarchy than the lot ID. Therefore, the shot identification information stored as the information on the lower data hierarchy than the lot ID associated with the cavity in which the abnormality is detected is equal to the data set including only the molded articles molded in the cavity in which the abnormality is detected. Therefore, in the embodiment, there is no need to generate a new data set when executing the processing of suspending shipping of all the molded articles molded in the cavity in which the abnormality is detected or the processing of discarding the molded article. Accordingly, when the molded articles molded in the specific cavity are collectively processed on the system of the molding management device 100, a processing load on the system can be reduced as compared with a case where a new data set is generated.

In the embodiment, in the operation data acquisition processing shown in FIG. 14, the operation identification information, the shot identification information, and the molding machine operation data, which are the job ID assigned with the lot ID as the information on the lower data hierarchy, are stored in the operation data storage unit 470 of the molding machine control device 350 in association with one another. Therefore, when a device other than the molding machine control device 350 acquires information from the molding machine control device 350, information in which the operation identification information, the shot identification information, and the molding machine operation data, which are acquired when the molded article is molded, are associated with one another can be acquired. Accordingly, when a device other than the molding machine control device 350 collectively processes the molded articles molded in the specific cavity on the system, the processing load on the system can be reduced.

B. Second Embodiment

In the first embodiment, the production plan generation unit 110 generates a production plan of a molded article. On the other hand, in a second embodiment, in addition to generating the production plan, the production plan generation unit 110 changes a production plan while the production plan is being executed and the molded article is being produced. For example, the production plan generation unit 110 changes a production plan when a defect rate of molded articles molded by the injection molding machine 310 increases during production of the molded articles and a cause of the increase in the defect rate is a defect of a cavity of a metal mold used for molding the molded articles.

Figure 21:
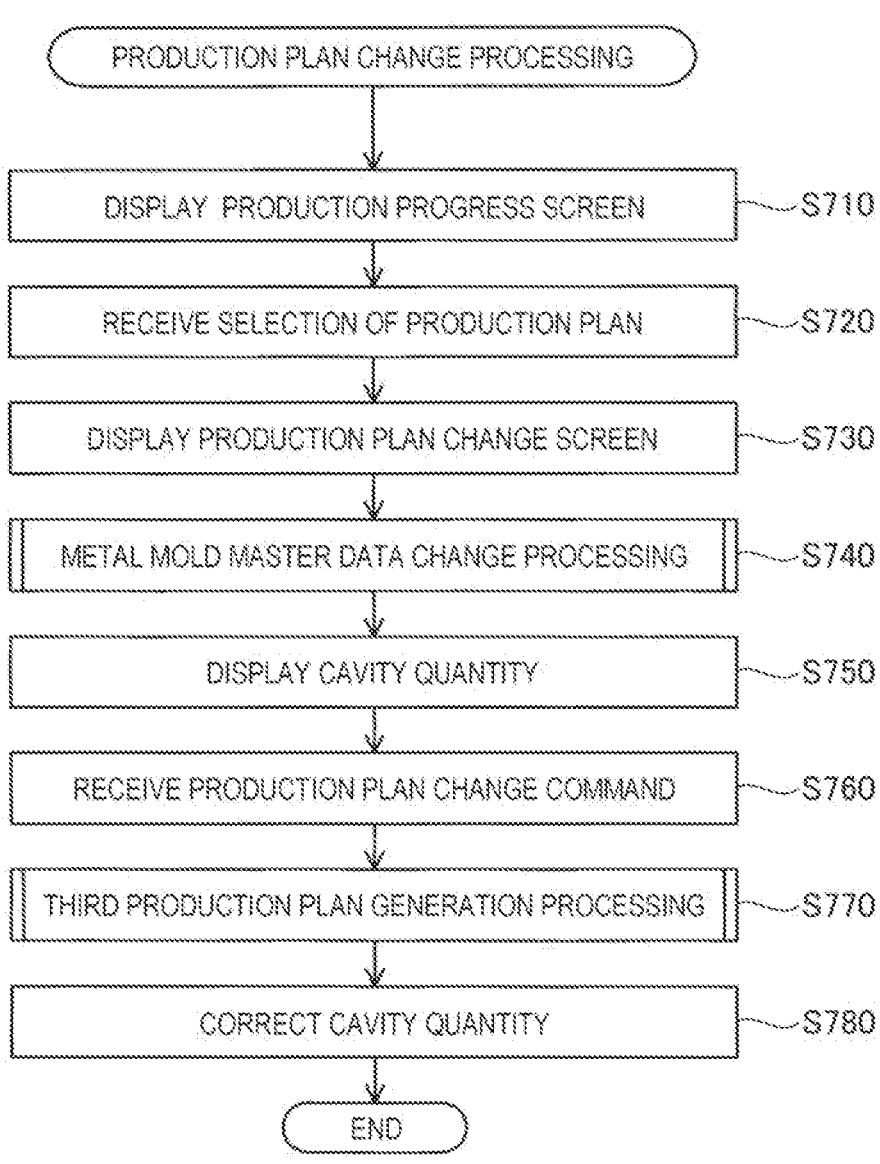
FIG. 21 is a diagram showing a process of production plan change processing.

FIG. 21 is a diagram showing a process of production plan change processing executed by the production plan generation unit 110. The production plan change processing is processing of changing a production plan currently being executed.

In step S710, the production plan generation unit 110 generates a production progress screen SC4, which is a screen for the user to select the production plan, and causes the display unit 60 to display the production progress screen SC4.

FIG. 22 is a diagram showing the production progress screen SC4. The production progress screen SC4 lists the production plans currently being executed. The production progress screen SC4 displays, for each production plan, the injection molding machine 310 being used, a molding item being produced, a metal mold used for molding a molded article, a quantity of the molded articles produced so far, a planned time at which production of the molded articles is completed, a defect rate of the molded articles, and a cycle time.

In step S720 in FIG. 21, the production plan generation unit 110 receives, from the user, a selection of a production plan to be changed. In step S720, the user selects the production plan to be changed from the production plans displayed on the production progress screen SC4 shown in FIG. 22.

In step S730, the production plan generation unit 110 generates a production plan change screen SC5, which is a screen for the user to input a change content of the production plan, and causes the display unit 60 to display the production plan change screen SC5.

Figure 23:
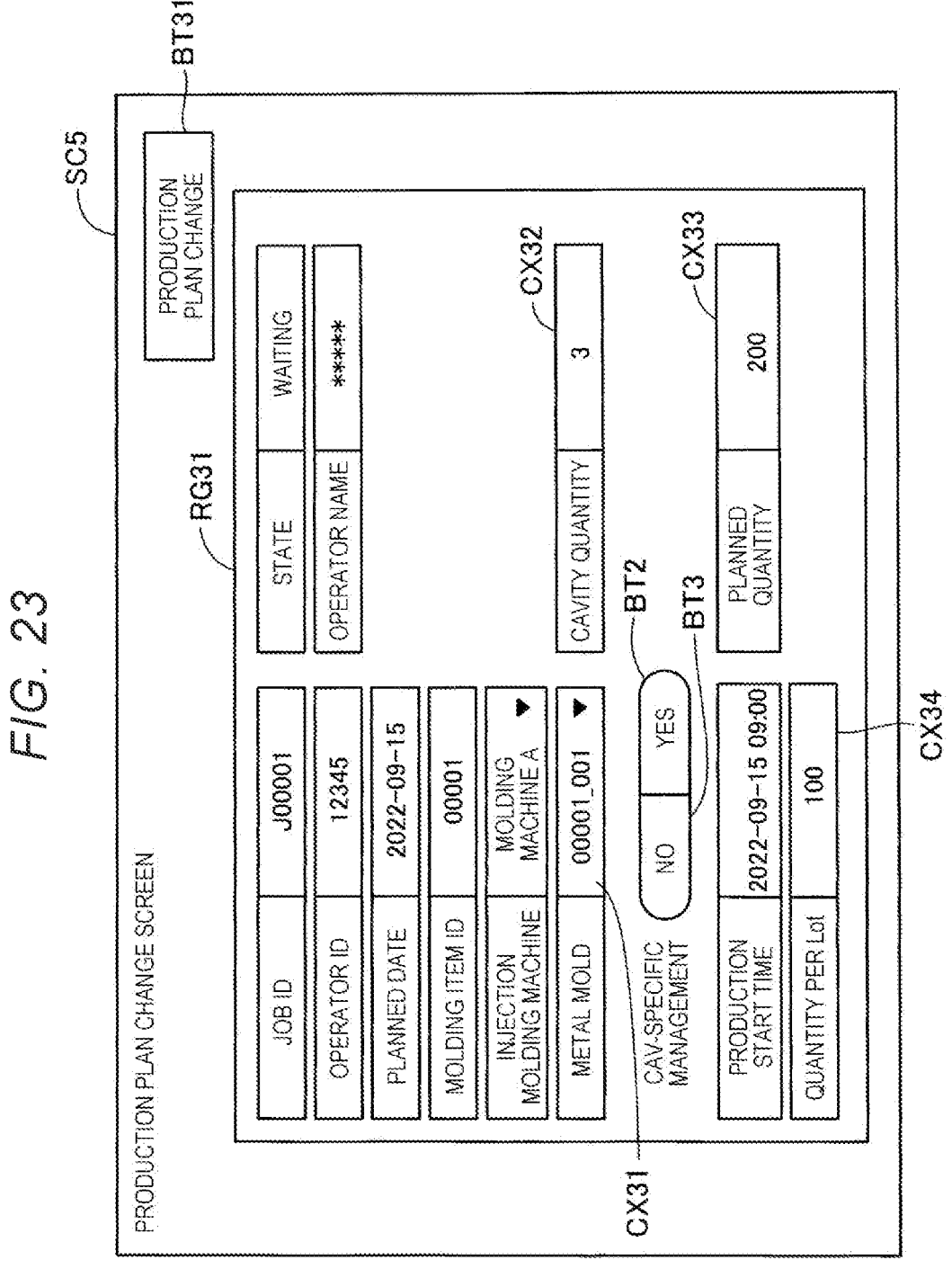
FIG. 23 is a diagram showing a production plan change screen.

FIG. 23 is a diagram showing the production plan change screen SC5. The production plan change screen SC5 is provided with a production plan change region RG31 and a production plan change button BT31.

In the production plan change region RG31, details of the production plan selected on the production progress screen SC4 shown in FIG. 22 in step S720 in FIG. 21 are displayed. The production plan change region RG31 is provided with a display field CX31 for displaying a metal mold used for molding a molded article, a display field CX32 for displaying a cavity quantity of the metal mold displayed in the display field CX31, a display field CX33 for displaying a production quantity of the molded articles, and a display field CX34 for displaying a quantity of the molded articles per lot. In addition to the above-described information, a job ID of the selected production plan, an ID number of a user who creates the production plan, an ID number of a molding item to be molded, and the like are displayed in the production plan change region RG31. The production plan change region RG31 is provided with the CAV-specific management execution button BT2 and the CAV-specific management non-execution button BT3, and either the CAV-specific management execution button BT2 or the CAV-specific management non-execution button BT3 is selected. When the CAV-specific management execution button BT2 is selected, the user selects the CAV-specific management execution button BT2 by clicking the CAV-specific management execution button BT2 in step S720.

In step S740 in FIG. 21, the production plan generation unit 110 executes metal mold master data change processing. In step S740, the user inputs a quantity of cavities to be used for molding the molded article in the cavity quantity input field BX11 on the metal mold master data change screen SC2 shown in FIG. 8, and clicks the save button BT11. For example, the user inputs a quantity of cavities without a defect in the cavity quantity input field BX11. The production plan generation unit 110 changes the cavity quantity of the metal mold displayed in the display field CX31 on the production progress screen SC4 to a value input in the cavity quantity input field BX11 on the metal mold master data change screen SC2, and stores the value in the master database.

In step S750, the production plan generation unit 110 causes the display field CX32 to display the cavity quantity of the metal mold changed in step S740.

In step S760, the production plan generation unit 110 receives, from the user, a command to change the production plan. When the user clicks the production plan change button BT31 on the production plan change screen SC5, the production plan generation unit 110 receives the command to change the production plan.

In step S770, the production plan generation unit 110 executes third production plan generation processing. The third production plan generation processing is processing of generating a production plan of molded articles using the cavity quantity changed in step S740.

Figure 24:
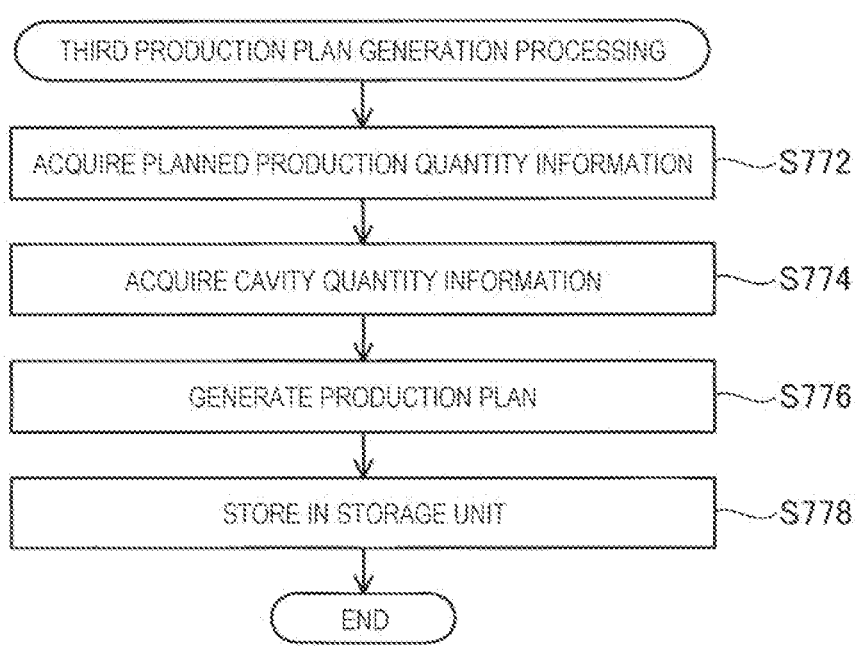
FIG. 24 is a diagram showing a process of third production plan generation processing.

FIG. 24 is a diagram showing a process of the third production plan generation processing.

In step S772, the third acquisition unit 230 acquires, as planned production quantity information, the production quantity of the molded articles displayed in the display field CX33 on the production plan change screen SC5 shown in FIG. 23.

In step S774 in FIG. 24, the fourth acquisition unit 240 acquires, as cavity quantity information, the cavity quantity displayed in the display field CX32 on the production plan change screen SC5 shown in FIG. 23.

In step S776 in FIG. 24, the plan generation unit 260 generates the production plan based on the planned production quantity information acquired by the third acquisition unit 230 and the cavity quantity information acquired by the fourth acquisition unit 240. The plan generation unit 260 first calculates a planned shot quantity after the production plan change. The plan generation unit 260 calculates a planned shot quantity per molding job after the production plan change and a planned shot quantity per manufacturing lot after the production plan change.

The planned shot quantity per molding job after the production plan change is calculated by the following equation (5). Here, the planned production quantity is a numerical value acquired by the third acquisition unit 230, the production quantity is a quantity of the molded articles produced so far, and the changed cavity quantity is a numerical value acquired by the fourth acquisition unit 240.

$$\text{(Planned shot quantity per molding job after production plan change)}=\text{((planned production quantity)}-\text{(production quantity))}+\text{(changed cavity quantity)} \quad (5)$$

The planned shot quantity per manufacturing lot after the production plan change is calculated by the following equation (6). The production plan generation unit 110 may change a quantity of the molded articles per manufacturing lot or a quantity of the manufacturing lot produced by the molding job based on the changed cavity quantity.

$$\text{(Planned shot quantity per manufacturing lot after production plan change)}=\text{(quantity of molded articles constituting each manufacturing lot)} \quad (6)$$

Next, the plan generation unit 260 calculates a planned production time per molding job after the production plan change and a planned production time per manufacturing lot after the production plan change.

The planned production time per molding job after the production plan change is calculated by the following equation (7).

$$\text{(Planned production time per molding job after production plan change)}=\text{(planned shot quantity per molding job after production plan change)}\times\text{(cycle time of one shot)} \quad (7)$$

The planned production time per manufacturing lot after the production plan change is calculated by the following equation (8).

$$\text{(Planned production time per manufacturing lot after production plan change)}=\text{(planned shot quantity per manufacturing lot after production plan change)}\times\text{(cycle time of one shot)} \quad (8)$$

The plan generation unit 260 may calculate the planned shot quantities after the production plan change by dividing the planned shot quantities after the production plan change, which are calculated by the equation (5) and the equation (6), respectively, by a non-defect rate of the molded article, in consideration of a case where a defective product is produced. The plan generation unit 260 may calculate the planned production times after the production plan change by dividing the planned production times after the production plan change, which are calculated by the equation (7) and the equation (8), respectively, by an operation rate of the injection molding machine 310, in consideration of a time during which the injection molding machine 310 abnormally stops.

In step S778, the production plan generation unit 110 causes the production database to store a job ID of a molding job whose plan is changed, a lot ID of the manufacturing lot produced by the above-described molding job, and the planned shot quantity per molding job after the production plan change, the planned shot quantity per manufacturing lot after the production plan change, the planned production time per molding job after the production plan change, and the planned production time per manufacturing lot after the production plan change, which are calculated in step S776, in association with one another. That is, the production plan generation unit 110 causes the production database to store the job ID of the molding job whose plan is changed, the lot ID of the manufacturing lot produced by the above-described molding job, and the changed production plan in association with one another. As described above, the third production plan generation processing is executed.

In step 780 in FIG. 21, the production plan generation unit 110 corrects the cavity quantity of the metal mold changed in step S740 to a value before the change. As described above, the production plan change processing is executed.

According to the second embodiment described above, the production plan generation unit 110 executes the production plan change processing of changing the production plan currently being executed. In the production plan change processing, the production plan generation unit 110 changes the cavity quantity used for molding the molded article, and calculates the planned shot quantity after the production plan change and the planned production time after the production plan change using the changed cavity quantity. Therefore, for example, when defects occur in a part of cavities of the metal mold during the production of the molded article, the molded article can be produced in the cavities excluding the cavity in which the defect occurs, and thus production of the defective product can be prevented. Since the changed production plan is stored in the production database, users other than the user who changes the production plan can confirm the changed production plan. Therefore, the work efficiency of each user can be improved.

C. Third Embodiment

In the embodiment, the molding management device 100 executes shipping suspension processing for preventing shipment of a molded article for which production is completed on a system. The shipping suspension processing is executed, for example, when an abnormality is detected in a cavity of a metal mold used for molding a molded article after production of the molded article is completed. Hereinafter, shipment of the molded article on the system is also referred to as shipping processing.

Figure 25:
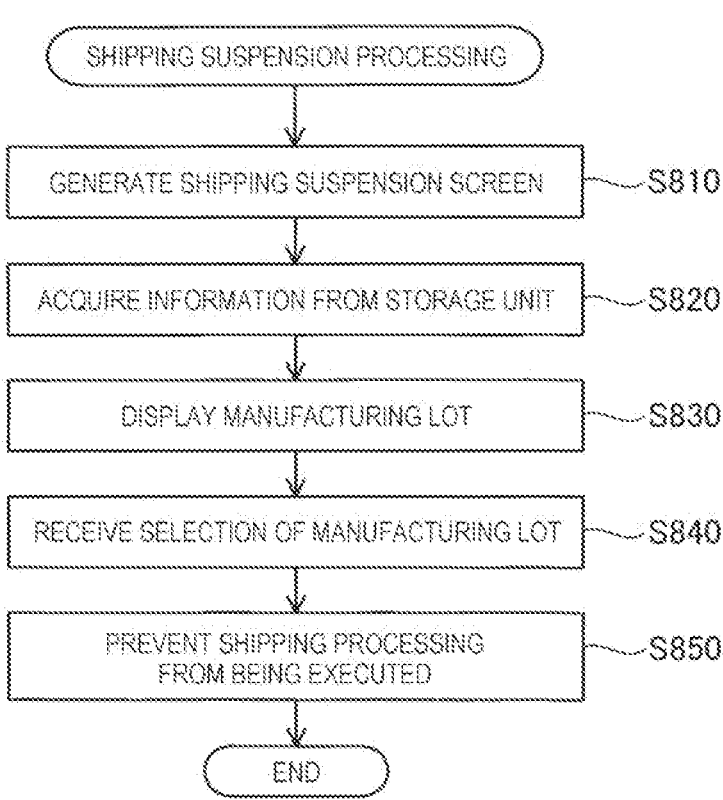
FIG. 25 is a diagram showing a process of shipping suspension processing.

FIG. 25 is a diagram showing a process of the shipping suspension processing executed by the processing unit 101 of the molding management device 100.

In step S810, the processing unit 101 generates a shipping suspension screen SC6, which is a screen for the user to search for and select a manufacturing lot for which the shipping processing cannot be executed, and displays the shipping suspension screen SC6 on the display unit 60.

Figure 26:
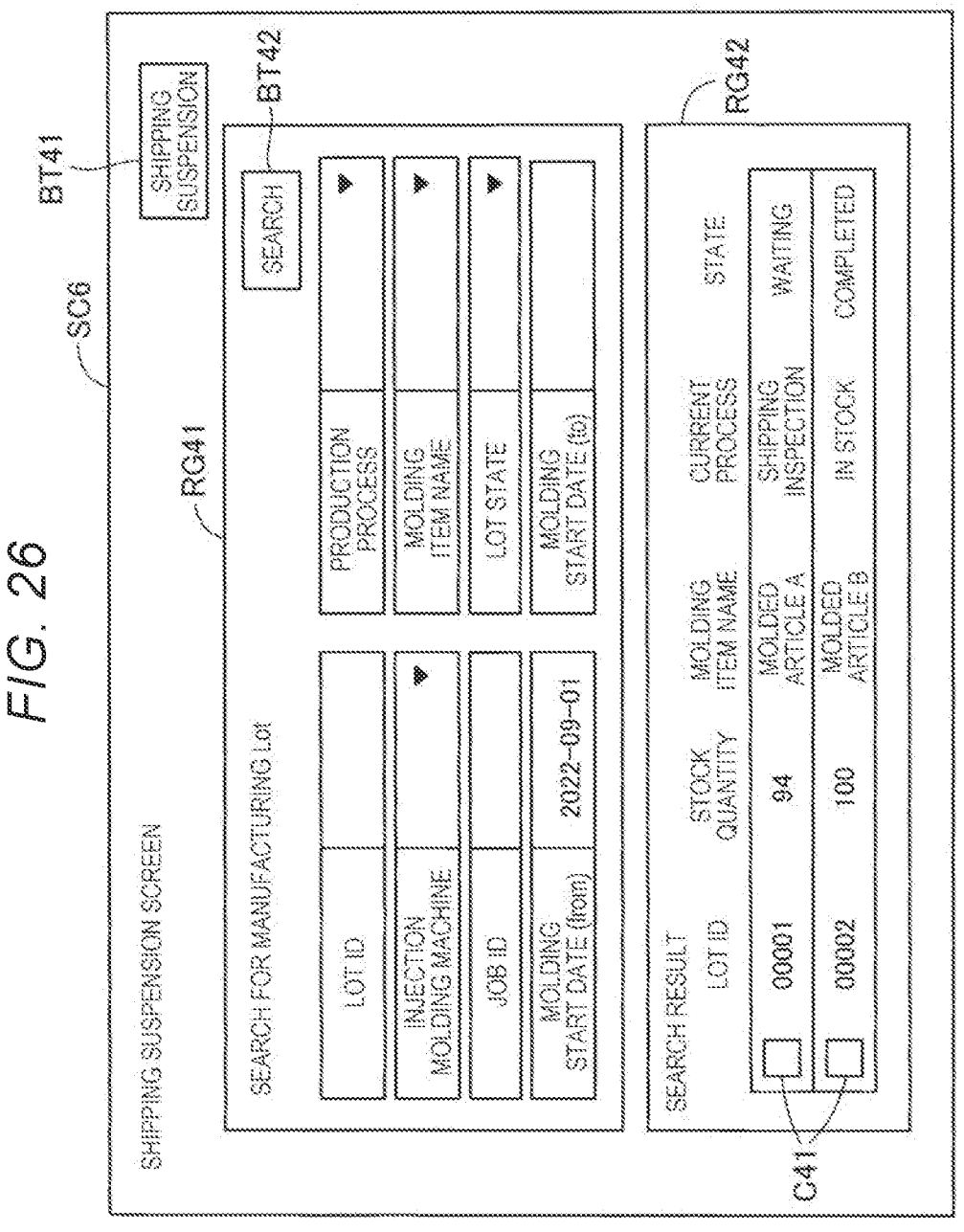
FIG. 26 is a diagram showing a shipping suspension screen.

FIG. 26 is a diagram showing the shipping suspension screen SC6. In step S810 in FIG. 25, the user uses the shipping suspension screen SC6 shown in FIG. 26 to search the system for the manufacturing lot for which the shipping processing cannot be executed. The shipping suspension screen SC6 is provided with a manufacturing lot search region RG41, a search result display region RG42, and a shipping suspension button BT41.

The manufacturing lot search region RG41 is provided with a search button BT42 and a plurality of input fields for inputting a lot ID of a molded article, a production process of the molded article, the injection molding machine 310 used for production of the molded article, a molding item name, a job ID, a state of a manufacturing lot, and a period during which the molded article is molded, respectively. The user inputs at least one of the above-described input fields with information on the manufacturing lot for which the shipping processing cannot be executed, and clicks the search button BT42.

In step S820 in FIG. 25, the processing unit 101 acquires, from the storage unit 102, information on a manufacturing lot that matches the information input in the manufacturing lot search region RG41 on the shipping suspension screen SC6 shown in FIG. 26.

In step S830 in FIG. 25, the processing unit 101 lists, in the search result display region RG42 on the shipping suspension screen SC6 shown in FIG. 26, manufacturing lots for which molding of molded articles is completed and which are not shipped to a shipping destination among the manufacturing lots acquired in step S820. In the search result display region RG42, a lot ID, a stock quantity, a molding item name, and the like are displayed for each manufacturing lot. The search result display region RG42 is provided with a check box C41 for selecting the manufacturing lot, which is associated with each manufacturing lot.

In step S840 in FIG. 25, the processing unit 101 receives, from the user, a selection of the manufacturing lot for which the shipping processing cannot be executed. The user selects the check box C41 corresponding to the manufacturing lot for which the shipping processing cannot be executed among the manufacturing lots displayed in the search result display region RG42 on the shipping suspension screen SC6 shown in FIG. 26, and clicks the shipping suspension button BT41.

In step S850 in FIG. 25, the processing unit 101 prevents the shipping processing for the manufacturing lot selected in step S840 from being executed. For example, when the shipping processing for the manufacturing lot selected in step S840 is executed, the processing unit 101 causes the display unit 60 to display a warning that the manufacturing lot cannot be shipped. As described above, the shipping suspension processing is executed.

Figure 27:
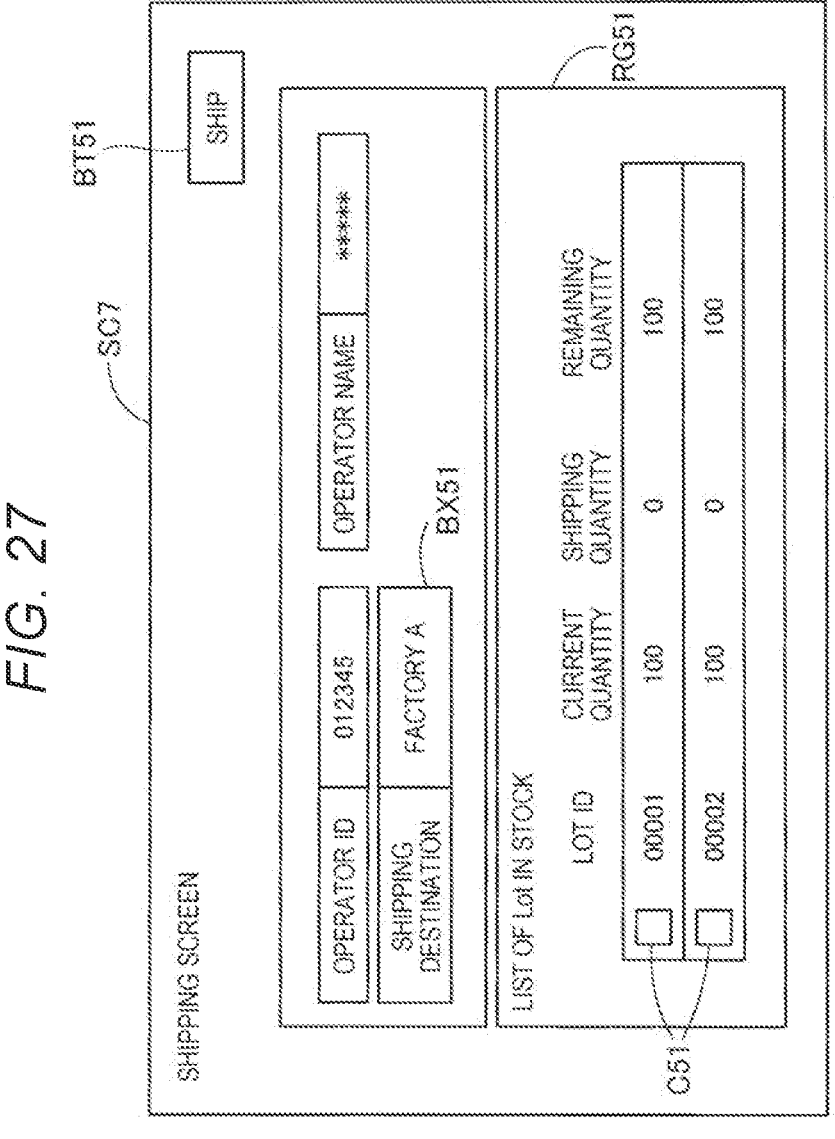
FIG. 27 is a diagram showing a shipping screen.

FIG. 27 is a diagram showing a shipping screen SC7 which is a screen operated by the user when the shipping processing for the manufacturing lot is executed. The shipping screen SC7 is generated by the processing unit 101 and displayed on the display unit 60. The shipping screen SC7 is provided with an input field BX51 for inputting a shipping destination of the manufacturing lot, a stock lot display region RG51, and a shipping button BT51. The stock lot display region RG51 lists manufacturing lots for which production of molded articles is completed and which are not shipped. The stock lot display region RG51 is provided with a check box C51 for selecting the manufacturing lot, which is associated with each manufacturing lot.

When shipping the manufacturing lot, the user inputs the shipping destination of the manufacturing lot in the input field BX51, selects the check box C51 corresponding to the manufacturing lot to be shipped, and then clicks the shipping button BT51. When the above-described operation is executed, in a case where the manufacturing lot selected on the shipping screen SC7 is a manufacturing lot for which the shipping suspension processing is not executed, the processing unit 101 executes the shipping processing for the selected manufacturing lot. For example, the processing unit 101 causes the display unit 60 to display a notification that the selected manufacturing lot is shipped. When the manufacturing lot selected on the shipping screen SC7 is the manufacturing lot for which the shipping suspension processing is executed, the processing unit 101 does not execute the shipping processing for the selected manufacturing lot. For example, the processing unit 101 causes the display unit 60 to display a notification that the selected manufacturing lot cannot be shipped.

According to the third embodiment described above, the molding management device 100 executes the shipping suspension processing for preventing the molded articles for which production is completed from being shipped on the system. The processing unit 101 of the molding management device 100 causes the display unit 60 to display a notification that the selected manufacturing lot cannot be shipped when the user selects and attempts to ship the manufacturing lot for which the shipping suspension processing is executed on the shipping screen SC7. Therefore, even when an abnormality is detected in the cavity of the metal mold used for molding the molded article after the production of the molded article is completed, the shipping processing for the manufacturing lot including the molded article molded in the cavity in which the abnormality is detected can be prevented from being executed. Therefore, shipping of a manufacturing lot having a high possibility of including a defective product can be prevented.

D. Other Embodiments (D-1) In the above embodiments, in the metal mold master data change processing, the metal mold master data change screen SC2 is displayed on the display unit 60 when the user executes a predetermined operation. On the other hand, when the CAV-specific management execution button BT2 on the production plan generation screen SC1 shown in FIG. 6 is selected in step S10 of the production plan generation processing shown in FIG. 5, the metal mold master data change screen SC2 may be popped up on the display unit 60.

(D-2) In the first embodiment, in the production plan generation processing shown in FIG. 5, when the metal mold master data change processing is executed, the production plan generation unit 110 does not correct the cavity quantity of the metal mold changed in the metal mold master data change processing to the value before the change after the production plan is generated. On the other hand, in the production plan generation processing, when the metal mold master data change processing is executed, the production plan generation unit 110 may correct the cavity quantity of the metal mold changed in the metal mold master data change processing to the value before the change after the production plan is generated. That is, after the production plan is generated, the production plan generation unit 110 may correct the cavity quantity of the metal mold stored in the master database to the value before the change in metal mold master data change processing.

(D-3) In the first embodiment, the molding machine control device 350 includes the shot identification information generation unit 450. On the other hand, the molding machine control device 350 may not include the shot identification information generation unit 450. In this case, in step S440 of the operation data acquisition processing shown in FIG. 14, the operation data storage control unit 440 may not cause the operation data storage unit 470 to store the shot identification information and the operation identification information stored in the operation identification information storage unit 460 in step S360 of the production processing in association with each other.

(D-4) In step S520 of the inspection result acquisition processing shown in FIG. 15, the first control inspection cycle identification unit 321 may generate information which is information for identifying an inspection cycle of a molded article each time the inspection of the molded article is executed. In this case, in step S530, the first control unit 321 may store the job ID, the lot ID, and the shot identification information, which are acquired in step S510, the inspection result of the molded article obtained in step S520, and the inspection cycle identification information in association with one another. In this case, in step S550, the first control unit 321 may transmit, to the molding management device 100, the job ID, the lot ID, and the shot identification information, which are acquired in step S510, the inspection result of the molded article obtained in step S520, and the inspection cycle identification information in association with one another.

(D-5) In the third embodiment, the molding management device 100 executes the shipping suspension processing after the production of the molded article is completed. On the other hand, after the production of the molded article is completed, the molding management device 100 may execute discarding processing of discarding the manufacturing lot on the system or total inspection processing of causing the inspection device 320 to inspect all the molded articles constituting the manufacturing lot.

(D-6) In the above embodiments, the production plan generated by the production plan generation unit 110 includes the planned shot quantity and the planned production time. On the other hand, the production plan generated by the production plan generation unit 110 may not include the planned shot quantity. That is, the production plan may be only the planned production time.

(D-7) In the above embodiments, the production plan generation unit 110 is implemented by the processing unit 101 of the molding management device 100 executing the program stored in the storage unit 102. On the other hand, the production plan generation unit 110 may be provided in the injection molding machine management system 10 as a production plan generation device independent of the molding management device 100.

E. Other Embodiments

The present disclosure is not limited to the above embodiments, and can be implemented in various aspects without departing from the scope of the present disclosure. For example, the present disclosure can be implemented in the following aspects. In order to solve a part of or all of problems of the present disclosure, or to achieve a part of or all of effects of the present disclosure, technical features of the above embodiments corresponding to technical features in each of the following aspects can be replaced or combined as appropriate. Technical features can be deleted as appropriate unless described as necessary in the present specification.

(1) According to an aspect of the present disclosure, a molding management device is provided. The molding management device is a molding management device for managing an injection molding machine that molds a molded article by injecting a molding material into a cavity of a mold. The molding management device includes: a first production unit information generation unit configured to generate first production unit information which is information on a molding job for molding the molded article; a second production unit information generation unit configured to generate second production unit information which is information on a lot of the molded article and is associated with a specific cavity; a first acquisition unit configured to acquire shot identification information which is information on a shot for injecting the molding material into the cavity; a second acquisition unit configured to acquire molded article information which is information on the molded article; and a storage unit. The storage unit stores the first production unit information, the second production unit information, the shot identification information, and the molded article information in association with one another, stores the second production unit information as information on a lower data hierarchy than the first production unit information, and stores the shot identification information as information on a lower data hierarchy than the second production unit information.

According to this aspect, when an abnormality is detected in a part of the cavities, the shot identification information stored as information on a lower data hierarchy than the lot ID associated with the cavity in which the abnormality is detected is equal to the data set including only the molded articles molded in the cavity in which the abnormality is detected. Therefore, when executing processing of suspending shipping of all the molded articles molded in the cavity in which the abnormality is detected or processing of discarding the molded article, it is not necessary to newly generate a data set including only the molded articles molded in the cavity in which the abnormality is detected. Accordingly, when the molded articles molded in the specific cavity are collectively processed on the system of the molding management device, a processing load on the system can be reduced as compared with a case where a new data set is generated.

(2) According to an aspect of the present disclosure, a production plan generation device is provided. The production plan generation device is a production plan generation device for generating a production plan of a molded article molded by an injection molding machine injecting a molding material into a cavity of a mold. The production plan generation device includes: a first production unit information generation unit configured to generate first production unit information which is information on a molding job for molding the molded article; a second production unit information generation unit configured to generate second production unit information which is information on a lot of the molded article and is associated with a specific cavity; a third acquisition unit configured to acquire planned production quantity information which is information on a planned production quantity of the molded article; a fourth acquisition unit configured to acquire cavity quantity information which is information on a quantity of the cavity; a data hierarchy setting unit configured to set the second production unit information as information on a lower data hierarchy than the first production unit information; and a plan generation unit configured to generate the production plan based on the first production unit information, the second production unit information, the planned production quantity information, and the cavity quantity information.

According to this aspect, since the second production unit information on the lot of the molded article is associated with the specific cavity, the manufacturing lot may include only the molded articles molded in the specific cavity when the molded article is produced.

(3) In the above aspect, the production plan may include a planned shot quantity which is a planned number of times of injecting the molding material into the cavity.

According to this aspect, the number of times of shots executed for each molding job can be stored in the storage unit.

(4) In the above aspect, the second production unit information generation unit may generate a plurality of pieces of the second production unit information for each cavity.

According to this aspect, a plurality of manufacturing lots each including molded articles molded in one specific cavity can be produced.

(5) According to an aspect of the present disclosure, a molding machine control device is provided. The molding machine control device is a molding machine control device for controlling an injection molding machine that molds a molded article by injecting a molding material into a cavity of a mold. The molding machine control device includes: a first production unit information acquisition unit configured to acquire first production unit information which is information on a molding job for molding the molded article; a second production unit information acquisition unit configured to acquire second production unit information which is information on a lot of the molded article and is associated with a specific cavity; an operation identification information storage unit configured to store operation identification information which is the first production unit information assigned with the second production unit information as information on a lower data hierarchy; an operation data acquisition unit configured to acquire molding machine operation data which is information on operation data of the injection molding machine; an operation data storage unit; and an operation data storage control unit configured to cause the operation data storage unit to store the molding machine operation data and the operation identification information in association with each other.

According to this aspect, when a device other than the molding machine control device acquires information from the molding machine control device, information in which the operation identification information acquired when the molded article is molded and the molding machine operation data are associated with each other can be acquired. Accordingly, when a device other than the molding machine control device collectively processes molded articles molded in a specific cavity on the system, the processing load on the system can be reduced.

(6) In the above aspect, the molding machine control device may further include a shot identification information generation unit configured to generate shot identification information, which is information on a shot for injecting the molding material into the cavity, for each molding cycle. The operation data storage control unit may cause the operation data storage unit to store the molding machine operation data and the shot identification information in association with each other.

According to this aspect, when a device other than the molding machine control device acquires information from the molding machine control device, information in which the operation identification information, the molding machine operation data, and the shot identification information, which are acquired when the molded article is molded, are associated with one another can be acquired.

What is claimed is:

1. A molding machine control device for controlling an injection molding machine that molds a plurality of molded articles by injecting a molding material into a plurality of cavities of a plurality of molds, the molding machine control device comprising:
a first production unit information acquisition unit configured to acquire first production unit information which is information on a plurality of molding jobs for molding the plurality of molded articles;

a second production unit information acquisition unit configured to acquire second production unit information which is information on a plurality of lots of the plurality of molded articles and is associated with a specific cavity of the plurality of cavities, each of the plurality of jobs having the plurality of lots;

a shot identification information generation unit configured to generate shot identification information, which is information on a plurality of shots for injecting the molding material into the plurality of cavities for each lot of the plurality of lots, each of the plurality of lots having the plurality of shots;

an operation identification information storage unit configured to:

store first operation identification information which is each of the plurality of jobs assigned with the plurality of lots as information on a first lower data hierarchy;

store second operation identification information which is each of the plurality of lots assigned with the plurality of shots as information on a second lower data hierarchy; and store third operation identification information which is one-to-one relationships between every one of the plurality of cavities and every combination between the plurality of lots and the plurality of shots;

an operation data acquisition unit configured to acquire molding machine operation data which is information on operation data of the injection molding machine;

an operation data storage unit; and an operation data storage control unit configured to cause the operation data storage unit to store the molding machine operation data and the first, second, and third operation identification information in association with each other as associated data, wherein the molding machine control device is further configured to provide the associated data to an external management device that is configured to manage a manufacturing system of the plurality of molded articles.

* * * * *